US012527544B2

(12) United States Patent
Hong et al.

(10) Patent No.: US 12,527,544 B2
(45) Date of Patent: Jan. 20, 2026

(54) HEART RHYTHM DETERMINATION USING MACHINE LEARNING

(71) Applicant: Caption Health, Inc., San Mateo, CA (US)

(72) Inventors: Ha Hong, San Ramon, CA (US); Nicolas Poilvert, Seattle, WA (US); Kilian Koepsell, San Francisco, CA (US); Nripesh Parajuli, Seattle, WA (US); Michael G. Cannon, Haverford, PA (US)

(73) Assignee: Caption Health, Inc., Waukesha, WI (US)

( * ) Notice: Subject to any disclaimer, the term of this patent is extended or adjusted under 35 U.S.C. 154(b) by 63 days.

(21) Appl. No.: 18/511,107

(22) Filed: Nov. 16, 2023

(65) Prior Publication Data

US 2024/0156430 A1 May 16, 2024

Related U.S. Application Data

(60) Provisional application No. 63/425,972, filed on Nov. 16, 2022.

(51) Int. Cl.
*A61B 8/08* (2006.01)
*A61B 8/00* (2006.01)
(Continued)

(52) U.S. Cl.
CPC ............ *A61B 8/0883* (2013.01); *A61B 8/463* (2013.01); *A61B 8/468* (2013.01); *A61B 8/5223* (2013.01);
(Continued)

(58) Field of Classification Search
CPC ....... A61B 8/0883; A61B 8/463; A61B 8/468; A61B 8/5223; A61B 8/488; A61B 8/5269;
(Continued)

(56) References Cited

U.S. PATENT DOCUMENTS 5,152,290 A * 10/1992 Freeland ............... A61B 8/543
600/443
5,280,792 A * 1/1994 Leong .................. A61B 5/7267
706/924

(Continued)

FOREIGN PATENT DOCUMENTS

WO WO-2022241155 A1 11/2022

OTHER PUBLICATIONS

Torp et al., Hans Torp, Echocardiography without electrocardiogram, European Journal of Echocardiography, vol. 12, Issue 1, Jan. 2011, pp. 3-10, https://doi.org/10.1093/ejechocard/jeq112.*

(Continued)

*Primary Examiner* — Bo Joseph Peng
(74) *Attorney, Agent, or Firm* — SPQ IP LLC

(57) ABSTRACT

Circuitless heart rhythm determination can include capturing a video clip of one or more image frames of a target organ through an ultrasound imaging device and submitting the frames to a classifier that has been trained with an annotated set of images, each of a corresponding heart muscle captured at a specified phase of a heart rhythm with a ground truth indication of the specified phase of the heart rhythm drawn from a separately recorded cycle graph of an electrical signal measured over time for the corresponding heart muscle. In response to the submission, a classification can be received of different portions of the submitted frames according to corresponding phases of the heart rhythm. Finally, a contemporaneous phase of the heart rhythm can be determined in the device without sensing electrical signals by way of a closed-loop sensor circuit affixed proximately to the target heart muscle.

10 Claims, 20 Drawing Sheets

(51) Int. Cl.
*G06T 7/00* (2017.01)
*G16H 50/20* (2018.01)

(52) U.S. Cl.
CPC ............ *G06T 7/0012* (2013.01); *G16H 50/20* (2018.01); *G06T 2207/10132* (2013.01); *G06T 2207/30048* (2013.01)

(58) Field of Classification Search
CPC ............ A61B 8/5284; A61B 8/56; A61B 8/02; G06T 7/0012; G06T 2207/10132; G06T 2207/30048; G16H 50/20
See application file for complete search history.

(56) References Cited

U.S. PATENT DOCUMENTS

| | | | |
|---|---|---|---|
| 5,745,382 A * | 4/1998 | Vilim | G05B 23/024 706/15 |
| 7,087,018 B2 * | 8/2006 | Comaniciu | G06F 18/2113 600/300 |
| 7,678,050 B2 | 3/2010 | Aase et al. | |
| 10,140,710 B2 | 11/2018 | Kreeger | |
| 10,470,677 B2 | 11/2019 | Cadieu et al. | |
| 10,595,731 B2 | 3/2020 | Gopalakrishnan et al. | |
| 10,631,791 B2 | 4/2020 | Cadieu et al. | |
| 10,726,548 B2 | 7/2020 | Cadieu et al. | |
| 10,806,402 B2 | 10/2020 | Cadieu et al. | |
| 10,937,156 B2 | 3/2021 | Bilenko et al. | |
| 11,160,510 B2 | 11/2021 | Cadieu et al. | |
| 11,166,678 B2 | 11/2021 | Cadieu et al. | |
| 11,497,451 B2 | 11/2022 | Cadieu et al. | |
| 11,497,475 B2 | 11/2022 | Cannon et al. | |
| 2001/0047130 A1 | 11/2001 | Walsh | |
| 2002/0077538 A1 | 6/2002 | Saranathan et al. | |
| 2005/0020903 A1 * | 1/2005 | Krishnan | G16H 50/20 600/407 |
| 2006/0058609 A1 * | 3/2006 | Olstad | A61B 8/463 600/407 |
| 2010/0168578 A1 | 7/2010 | Garson, Jr. et al. | |
| 2013/0066211 A1 | 3/2013 | Konofagou et al. | |
| 2013/0165781 A1 | 6/2013 | Cardinale et al. | |
| 2014/0094689 A1 * | 4/2014 | Cohen | A61B 5/7425 600/424 |
| 2015/0214434 A1 | 7/2015 | Fujiwara et al. | |
| 2017/0065484 A1 * | 3/2017 | Addison | A61B 5/7264 |
| 2018/0153505 A1 | 6/2018 | Cadieu et al. | |
| 2018/0153514 A1 | 6/2018 | Zhai et al. | |
| 2018/0260949 A1 | 9/2018 | Kreeger | |
| 2018/0344292 A1 * | 12/2018 | Viggen | A61B 8/463 |
| 2019/0104949 A1 | 4/2019 | Cadieu et al. | |
| 2019/0392577 A1 | 12/2019 | Cadieu et al. | |
| 2019/0392581 A1 | 12/2019 | Cadieu et al. | |
| 2020/0085394 A1 | 3/2020 | Turcea et al. | |
| 2020/0163650 A1 * | 5/2020 | Kruger | A61B 5/318 |
| 2020/0205687 A1 * | 7/2020 | Rubin | A61B 5/7264 |
| 2020/0245970 A1 | 8/2020 | Cadieu et al. | |
| 2020/0245976 A1 | 8/2020 | Cadieu et al. | |
| 2020/0250813 A1 | 8/2020 | Bilenko et al. | |
| 2021/0052253 A1 | 2/2021 | Cadieu et al. | |
| 2021/0052255 A1 | 2/2021 | Cadieu et al. | |
| 2021/0236094 A1 | 8/2021 | Cannon et al. | |
| 2021/0345934 A1 * | 11/2021 | Landgraf | A61B 5/6898 |
| 2022/0104790 A1 | 4/2022 | Cadieu et al. | |
| 2022/0361799 A1 | 11/2022 | Hong et al. | |

OTHER PUBLICATIONS

Aase et al., Echocardiography without electrocardiogram. Eur J Echocardiogr. 12(1):3-10 (2011).

Alivecor, Press Release: ITC administrative law judge finds apple infringed AliveCor's patented technology. 4pgs. Jun. 27, 2022. Available at https://alivecor.com/press/press_release/itc-rules-apple-violated-alivecors-patents.

Ciusdel et al., Deep neural networks for ECG-free cardiac phase and end-diastolic frame detection on coronary angiographies. pp. 1-16 (2020). Available at https://arxiv.org/abs/1811.02797.

Johnson et al., Practical tips and tricks in measuring strain, strain rate and twist for the left and right ventricles. Echo Res Pract. 6(3):R87-R98 (2019).

Kusunose et al., Index-beat assessment of left ventricular systolic and diastolic function during atrial fibrillation using myocardial strain and strain rate. J Am Soc Echocardiogr. 25(9):953-959 (2012).

Lang et al., Recommendations for cardiac chamber quantification by echocardiography in adults: an update from the American Society of Echocardiography and the European Association of Cardiovascular Imaging. J Am Soc Echocardiogr. 28(1):1-39.e14 (2015).

Lee et al., Automatic determination of the fetal cardiac cycle in ultrasound using spatio-temporal neural networks. Inst of Biomed Eng, Dept of Eng Sci, University of Oxford, UK. pp. 1- 4 (2020). Available at https://ora.ox.ac.uk/objects/uuid:8afb5d00-3846-4db6-9fb2-b6ea3c71970f/download_file?safe_filename=ISBI%2B248.pdf&file_format=pdf&type_of_work=Conference+item.

Thalmayer et al., A Robust and real-time capable envelope-based algorithm for heart sound classification: validation under different physiological conditions. Sensors (Basel). 20(4):972, pp. 1-21 (2020).

Yang et al., Convolutional neural network for the detection of end-diastole and end-systole frames in free-breathing cardiac magnetic resonance imaging. Comput Math Methods Med. 2017:1640835, pp. 1-10 (2017).

Zolgharni et al., Automatic detection of end-diastolic and end-systolic frames in 2D echocardiography. Echocardiography. 34(7):956-967 (2017).

* cited by examiner

Normal Sinus Rhythm

HEART RHYTHM DETERMINATION USING MACHINE LEARNING

CROSS-REFERENCE

This application claims the benefit of U.S. Provisional Application No. 63/425,972, filed Nov. 16, 2022, which is incorporated herein by reference in its entirety.

BACKGROUND

Cardiac monitoring generally refers to continuous or intermittent monitoring of heart activity, generally by electrocardiography, with assessment of the patient's condition relative to their cardiac rhythm. Generally, cardiac monitoring requires the affixation of two or more different sensors upon the surface of the body so as to create individual two-sensor electrical circuits. Then, as the electrical signals imparted upon different portions of a monitored heart muscle intensify and then wane, different pairs of the sensors forming different circuits measure different aspects of what is known as the cardiac cycle or heart rhythm (e.g. a heart cycle). The foregoing is known as an electrocardiogram, abbreviated as "ECG" or "EKG".

The cardiac cycle, or heart rhythm (e.g. a heart cycle), is the performance of the human heart from the beginning of one heartbeat to the beginning of the next heartbeat. The cycle consists of two periods: one during which the heart muscle relaxes and refills with blood, referred to as diastole, following a period of contraction and the pumping of blood, referred to as systole. The heart rhythm (e.g. a heart cycle) is known to include five different phases of which three are generally visible in a graph representative of the heart rhythm, and in most cases all five are visible. The first phase of the heart rhythm is the P-cycle representative of the conduction of electrical impulses to the atria of the heart causing the atria to contract followed by a brief delay and then the QRS complex portion of the heart rhythm (e.g. a heart cycle), which reflects the spread of electrical activity through the ventricular myocardium and inherently includes three of the five phases of the heart rhythm and is known as the R-wave portion. Thereafter, following another short delay, the T-cycle commences and reflects the repolarization of the ventricles thereby restoring the heart into a resting state.

The graph representative of the heart rhythm generally is the product of the ECG. However, there are many occasions when processing the heart rhythm can be important outside of the conduct of an ECG for instance knowing a contemporaneous moment during the heart rhythm can be advantages when performing a cardiac ultrasound. However, the quality of an ECG depends upon the placement and number of electrodes placed upon the patient and the resulting quality of contact between each electrode and a patient. As well, during a cardiac ultrasound, where it is necessary to manipulate an ultrasound wand, the necessity of different sensors and wires placed upon the chest of the patient usually necessary to obtain an ECG with a clinically sufficient quality can be unwieldy and modern ultrasound units generally lack an internal ECG capability. Accordingly, solutions for knowing the heart rhythm and/or correlating the heart rhythm to acquired images without requiring a full set of ultrasound leads are needed to improve clinical ultrasound measurements.

SUMMARY

Disclosed herein are systems, methods, and media that address deficiencies of the art in respect to heart rhythm determination during cardiac ultrasound and provide for circuitless heart rhythm determination during cardiac ultrasound. A method for a circuitless heart rhythm determination includes capturing a video clip of one or more image frames of a target heart muscle through a cardiac ultrasound imaging device, and submitting the one or more image frames to a classifier that has been trained with an annotated set of images, each of a corresponding heart muscle captured at a specified phase of a heart rhythm with a ground truth indication of the specified phase of the heart rhythm drawn from a separately recorded cycle graph of an electrical signal measured over time for the corresponding heart muscle.

In some aspects, described herein are methods and systems for ultrasound imaging. In some embodiments, the methods comprise acquiring a plurality of ultrasound images of at least a portion of an organ of a subject, the plurality of ultrasound images comprising images captured across at least one full heart rhythm. In some embodiments, the methods comprise determining based on one or more of the acquired plurality of ultrasound images, a heart rhythm characteristic corresponding to the one or more of the acquired plurality of images. In some embodiments, the methods comprise constructing, based on a determined heart rhythm characteristic, an image-derived EKG.

In some embodiments, the step of acquiring the plurality of ultrasound images is performed in real-time. In some embodiments, the methods comprise alerting a user in real time that an image-derived EKG deviates from a reference EKG by more than a threshold value.

In some embodiments, the methods comprise determining that the image-derived EKG indicates an abnormal condition in the subject. In some embodiments, the methods comprise indicating to a user an identity of the abnormal condition. In some embodiments, the abnormal condition is: ST Segment Elevated Myocardial Infarction, Septal Flash, and/or a left bundle-branch blockage. In some embodiments, the reference EKG is a normal sinus rhythm.

In some embodiments, the methods comprise computing a deviation of the image-derived EKG from a normal sinus rhythm. In some embodiments, the methods comprise providing a real time indicator of heart rhythm quality to a user during scanning.

In some embodiments, the plurality of ultrasound images are automatically saved in a memory of the ultrasound system upon determination that images representing at least one full heart rhythm have been acquired. In some embodiments, the plurality of ultrasound images are automatically saved in a memory of the ultrasound system upon determination that images representing at least a part of a full heart rhythm sufficient to make a diagnostic determination has been acquired. In some embodiments, the methods comprise receiving an EKG signal from one or more EKG wire leads attached to the subject, wherein the step of constructing the image-derived EKG in (c) is further based on the EKG signal.

In some embodiments, the image-derived EKG is constructed using no more than 1, 2, 3, 4, 5, 6, 7, 8, 9, 10, 11, or 12 EKG wire leads attached to the subject. In some embodiments, the image-derived EKG is constructed using no more than 1, 2, 3, 4, 5, 6, 7, 8, 9, or 10 electrodes attached to the subject. In some embodiments, the image-derived EKG is constructed without the use of EKG wire leads attached to the subject. In some embodiments, the image-derived EKG is of a comparable quality to a standard 12-lead EKG.

In some embodiments, the methods comprise providing a heart rhythm quality indicator to the user during scanning. In some embodiments, the methods comprise providing a heart rhythm quality indicator to the user upon evaluation of pre-recorded images. In some embodiments the quality indicator is used to show that the patient is in sinus rhythm. In some embodiments, multi-frame image clips are used for assessments that require regular heart rhythm.

In some embodiments, the methods comprise acquiring the plurality of ultrasound image clips using an autocapture, a save-best-clip, and/or a clip selector mode.

In some embodiments, constructing the image-derived EKG comprises using a neural network to analyze an image frame sequence of the plurality of acquired ultrasound images and assessing a time interval of one or more heart rhythm (e.g. a heart cycle)s. In some embodiments, the plurality of ultrasound images are automatically saved in a memory of the ultrasound system upon detection of at least one index beat. In some embodiments, the plurality of ultrasound images are automatically saved in a memory of the ultrasound system upon determination that images representing an image clip having a clinically sufficient length and quality for a selected view of the target organ.

The methods can additionally comprise receiving in response to the submission, a classification of different portions of the submitted image frames according to corresponding phases of the heart rhythm (e.g. a heart cycle). The method can comprise presenting an indication in the cardiac ultrasound imaging device, of a contemporaneous one of the corresponding phases of the heart rhythm for the target heart muscle. Importantly, the contemporaneous phase of the heart rhythm for the target heart muscle can be determined in the ultrasound imaging device without sensing electrical signals by way of a closed-loop sensor circuit affixed proximately to the target heart muscle, or can utilize a reduced number of ECG leads in order to improve the resolution of an ECG signal based upon analysis of acquired images. In this way, the determined heart rhythm can be used in order to further acquisition of clinically useful ultrasound imagery by the cardiac ultrasound imaging device.

To that end, in some aspects, the classification of the captured imagery is the classification of a portion of the frames of the video clip corresponding to an R-wave portion of the cycle graph measured over the heart rhythm (e.g. a heart cycle). In another aspect of the embodiment, the classification of the captured imagery is the classification of a portion of the frames of the video clip corresponding to an R-to-R interval of the cycle graph measured over multiple different heart rhythm (e.g. a heart cycle)s. In respect to the latter, a number of the different heart rhythm (e.g. a heart cycle)s may be specified so that the frames of the video clip may be clipped to include only portions of the frames of the video clip corresponding to the R-to-R interval for the specified number of the different heart rhythm (e.g. a heart cycle)s. Then, playback of the clipped frames may be looped in order to provide a periodic view of the clipped frames in support of a specific medical diagnosis while excluding other portions of the frames not pertinent to the diagnosis.

In some aspects, the method additionally includes identifying portions of the frames of the video clip corresponding to an R-wave while removing remaining other portions of the frames of the video clip. In even yet another aspect of the embodiment, a model curve may be generated from the separately recorded cycle graph. Thereafter, the generated contemporaneous cycle graph may be curve fitted to the model curve in order to smooth the generated graph and to more accurately present the generated graph.

In some aspects, a data processing system is adapted for circuitless heart rhythm determination during cardiac ultrasound. The system includes a host computing platform of one or more computers, each with memory and at least one processor. The system also includes a heart rhythm determination module. The module in turn includes computer program instructions enabled while executing in the host computing platform to submit a captured video clip of one or more image frames of a target heart muscle to a classifier trained with an annotated set of images each of a corresponding heart muscle captured at a specified phase of a heart rhythm with a ground truth indication of the specified phase of the heart rhythm drawn from a separately recorded cycle graph of an electrical signal measured over time for the corresponding heart muscle. The instructions further are enabled to receive in response to the submission, a classification of different portions of the submitted frames according to corresponding phases of the heart rhythm (e.g. a heart cycle). Finally, the instructions are enabled to present an indication in the cardiac ultrasound imaging device, of a contemporaneous cycle graph for the target heart muscle without sensing electrical signals by way of a closed-loop sensor circuit affixed proximately to the target heart muscle.

Disclosed herein are platforms, systems, and methods for real-time ultrasound imaging guidance that facilitates efficient and accurate ultrasound imaging. The platforms, systems, and methods can detect a position in a heart rhythm (e.g. a heart rhythm (e.g. a heart cycle)) based on analysis of one or more acquired ultrasound images. In particular, analysis of acquired images can be used to reconstruct an ECG readout, or otherwise indicate to a user a position in a heart rhythm corresponding to acquired images based on observations of the content of the acquired images. This analysis can be further used to The ultrasound guidance can be configured as a sequence or plurality of simple and informative instructions or indications thereof. This sequence of instructions may be configured to account for potentially rapid fluctuations and/or contradictions in image analyses which can arise for various reasons such as poor image quality and/or probe positioning.

Ultrasound can be used to image various organs and systems including cardiac, vascular, pulmonary, abdominal, obstetric, gynecological, musculoskeletal, small organs, nerves and more. Each of these clinical applications calls for different, highly demanding skills on the part of the operator of the ultrasound device. To learn how to properly scan and perform diagnostic-quality studies takes years of study and practice. Moreover, current ultrasound devices have a large number of transducer types available, a multitude of scanning modes, a dense array of interactive imaging settings and parameters, and large numbers of measurements and calculations that can be performed. This complexity is greatly increased by the extensive number of patient conditions, body types, and diseases. To master all of these factors and produce high-quality studies is a laborious task for highly-trained experts.

The platforms, systems, and methods disclosed herein provide improved ultrasound guidance compared to conventional ultrasound systems. For example, a conventional ultrasound device may provide static lists of protocols to remind the person scanning, such as a physician, sonographer, or other trained medical professional, what anatomical targets to seek and which views to obtain for a particular type of examination. Systems also have sophisticated presets that combine multitudinous imaging settings such as image gain, frame rate, scanning depth, grayscale presentation, blood flow filters, and imaging regions of interest in order to improve workflow for users. However, these presets can be complicated and difficult to use, and the user must know navigational techniques and presets by memory and experience in order to effectively operate the ultrasound device.

Disclosed herein, in some aspects, are platforms, systems, and methods that use image processing or machine learning methods to analyze images in real-time and derive information from the image about the pose of the probe and how it relates in space to a correct and diagnostic-quality image. These methods can be used to provide instructions to the user for how to hold and manipulate the probe for better results. The ultrasound guidance technology can make it possible for lesser-trained users to perform an ultrasound examination.

In one aspect described herein are methods for guiding an ultrasound imaging procedure. In some embodiments, the methods can comprise receiving one or more ultrasound images acquired through an ultrasound imaging system. In some embodiments, the methods can comprise evaluating said one or more ultrasound images using a trained machine learning model to determine a difference between current probe position and an optimal probe position. In some embodiments, the methods can comprise calculating a confidence or probability of improving clinical image quality for each of a plurality of probe movements for reducing said difference between said current probe position and said optimal probe position. In some embodiments, the methods can comprise providing guidance for said plurality of probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof In some embodiments, said plurality of probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof.

In some embodiments, said visual indicators, said audio indicators, said haptic indicators, or any combination hereof are provided simultaneously. In some embodiments, said visual indicators, said audio indicators, said haptic indicators, or any combination hereof are provided in real-time without time delay. In some embodiments, said visual indicators, said audio indicators, said haptic indicators, or any combination thereof are configured to convey information regarding said confidence or probability of improving clinical image quality for each of said plurality of probe movements.

In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the methods can further comprise providing instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of probe movements is independently calculated.

In some embodiments, at least a subset of said plurality of probe movements contradict each other. In some embodiments, said subset of said plurality of probe movements correspond to movements that cannot be performed simultaneously. In some embodiments, said subset of said plurality of probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the methods can further comprise receiving one or more additional ultrasound images acquired through said ultrasound imaging system after displaying said guidance. In some embodiments, the methods can further comprise analyzing said at least a subset of said one or more ultrasound images or said one or more additional ultrasound images to determine clinical image quality.

In some embodiments, methods described herein can comprise receiving one or more ultrasound images acquired through an ultrasound imaging device. In some embodiments, methods described herein can comprise evaluating said one or more ultrasound images using a trained machine learning model to determine a difference between a current ultrasound probe position and an optimal ultrasound probe position. In some embodiments, methods described herein can comprise determining a clinical image quality of said one or more ultrasound images based at least on said difference between said current ultrasound probe position and said optimal ultrasound probe position. In some embodiments, methods described herein can comprise identifying a plurality of possible probe movements for reducing said difference between said current probe position and said optimal probe position. In some embodiments, methods described herein can comprise calculating a confidence or probability of improving clinical image quality for each of said plurality of possible probe movements. In some embodiments, methods described herein can comprise providing guidance for said plurality of possible probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof. In some embodiments, said visual indicators, said audio indicators, said haptic indicators, or any combination hereof are provided simultaneously. In some embodiments, said visual indicators, said audio indicators, said haptic indicators, or any combination hereof for said plurality of possible probe movements are provided in real-time without time delay.

In some embodiments, said visual indicators, said audio indicators, said haptic indicators, or any combination thereof are configured to convey information regarding said confidence or probability of improving clinical image quality for each of said plurality of probe movements. In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the methods can further comprise providing instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of possible probe movements is independently calculated.

In some embodiments, at least a subset of said plurality of possible probe movements contradict each other. In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging device is a portable ultrasound imaging device. In some embodiments, said ultrasound imaging device is configured for performing echocardiography.

In some embodiments, the methods can further comprise receiving one or more additional ultrasound images acquired through said ultrasound imaging device after displaying said guidance. In some embodiments, the methods can further comprise analyzing said at least a subset of said one or more ultrasound images or said one or more additional ultrasound images to determine clinical image quality.

In another aspect described herein are ultrasound systems comprising at least one processor, a memory, and computer executable instructions. In some embodiments, the instructions, when executed by the at least one processor, causes the processor to receive one or more ultrasound images acquired through an ultrasound imaging probe. In some embodiments, the instructions, when executed by the at least one processor, causes the processor to evaluate said one or more ultrasound images using a trained machine learning model to determine a difference between current probe position and an optimal probe position. In some embodiments, the instructions, when executed by the at least one processor, causes the processor to calculate a confidence or probability of improving clinical image quality for each of a plurality of probe movements for reducing said difference between said current probe position and said optimal probe position. In some embodiments, the instructions, when executed by the at least one processor, causes the processor to provide guidance for said plurality of probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof. In some embodiments, said visual indicators, said audio indicators, said haptic indicators, or any combination hereof for said plurality of possible probe movements are provided simultaneously.

In some embodiments, said visual indicators, said audio indicators, said haptic indicators, or any combination hereof for said plurality of possible probe movements are provided in real-time without time delay. In some embodiments, said visual indicators, said audio indicators, said haptic indicators, or any combination thereof are configured to convey information regarding said confidence or probability of improving clinical image quality for each of said plurality of probe movements. In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the systems can further comprise providing instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of possible probe movements is independently calculated. In some embodiments, at least a subset of said plurality of possible probe movements contradict each other.

In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the systems can further comprise receiving one or more additional ultrasound images acquired through said ultrasound imaging probe after providing said guidance. In some embodiments, the systems can further comprise analyzing said at least a subset of said one or more ultrasound images or said one or more additional ultrasound images to determine clinical image quality. In some embodiments, ultrasound systems described herein can comprise computer executable instructions that, when executed by the at least one processor, cause the processor to receive one or more ultrasound images acquired through an ultrasound imaging probe. In some embodiments, ultrasound systems described herein can comprise computer executable instructions that, when executed by the at least one processor, cause the processor to evaluate said one or more ultrasound images using a trained machine learning model to determine a difference between a current ultrasound probe position and an optimal ultrasound probe position. In some embodiments, ultrasound systems described herein can comprise computer executable instructions that, when executed by the at least one processor, cause the processor to determine a clinical image quality of said one or more ultrasound images based at least on said difference between said current ultrasound probe position and said optimal ultrasound probe position. In some embodiments, ultrasound systems described herein can comprise computer executable instructions that, when executed by the at least one processor, cause the processor to identify a plurality of possible probe movements for reducing said difference between said current probe position and said optimal probe position. In some embodiments, ultrasound systems described herein can comprise computer executable instructions that, when executed by the at least one processor, cause the processor to calculate a confidence or probability of improving clinical image quality for each of said plurality of possible probe movements. In some embodiments, ultrasound systems described herein can comprise computer executable instructions that, when executed by the at least one processor, cause the processor to display guidance for said plurality of possible probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof.

In some embodiments, said visual indicators for said plurality of possible probe movements are displayed simultaneously. In some embodiments, said visual indicators, said audio indicators, said haptic indicators, or any combination hereof are provided in real-time without time delay. In some embodiments, said visual indicators, said audio indicators, said haptic indicators, or any combination thereof are configured to convey information regarding said confidence or probability of improving clinical image quality for each of said plurality of probe movements.

In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof. In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the systems can further comprise providing instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality.

In some embodiments, said guidance is provided in real-time without delay based on a time filter or thresholding. In some embodiments, said confidence or probability of improving clinical image quality for each of said plurality of possible probe movements is independently calculated. In some embodiments, at least a subset of said plurality of possible probe movements contradict each other. In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the systems can further comprise receiving one or more additional ultrasound images acquired through said ultrasound imaging probe after providing said guidance. In some embodiments, the systems can further comprise analyzing said at least a subset of said one or more ultrasound images or said one or more additional ultrasound images to determine clinical image quality.

In another aspect, described herein are non-transitory computer-readable storage media encoded with instructions that, when executed by a processor, causes the processor to receive one or more ultrasound images acquired through an ultrasound imaging system. In some embodiments, the instructions, when executed by a processor, causes the processor to evaluate said one or more ultrasound images using a trained machine learning model to determine a difference between current probe position and an optimal probe position. In some embodiments, the instructions, when executed by a processor, causes the processor to calculate a confidence or probability of improving clinical image quality for each of a plurality of probe movements for reducing said difference between said current probe position and said optimal probe position. In some embodiments, the instructions, when executed by a processor, causes the processor to display guidance for said plurality of probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, wherein said graphical representation comprises visual indicators for said plurality of probe movements, wherein said audio representation comprises audio indicators for said plurality of probe movements, wherein said haptic representation comprises haptic indicators for said plurality of probe movements, or any combination thereof.

In some embodiments, said visual indicators for said plurality of possible probe movements are displayed simultaneously. In some embodiments, said visual indicators, said audio indicators, said haptic indicators, or any combination hereof are provided in real-time without time delay. In some embodiments, said visual indicators, said audio indicators, said haptic indicators, or any combination thereof are configured to convey information regarding said confidence or probability of improving clinical image quality for each of said plurality of probe movements. In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the non-transitory computer-readable storage media can further comprise instructions that, when executed, cause the processor to provide instructions for improving clinical image quality using patient instructions, ultrasound scan system settings, or both. In some embodiments, said patient instructions comprise patient breathing or body position. In some embodiments, wherein said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of possible probe movements is independently calculated. In some embodiments, at least a subset of said plurality of possible probe movements contradict each other.

In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the non-transitory computer-readable storage media can further comprise instructions that, when executed, cause the processor to receive one or more additional ultrasound images acquired through said ultrasound imaging system after displaying said guidance. In some embodiments, the non-transitory computer-readable storage media can further comprise instructions that, when executed, cause the processor to analyze said at least a subset of said one or more ultrasound images or said one or more additional ultrasound images to determine clinical image quality.

In another aspect, described herein are non-transitory computer-readable storage media encoded with instructions that, when executed by a processor, causes the processor to receive one or more ultrasound images acquired through an ultrasound imaging system. In some embodiments, the instructions, when executed by a processor, causes the processor to evaluate said one or more ultrasound images using a trained machine learning model to determine a difference between a current ultrasound probe position and an optimal ultrasound probe position. In some embodiments, the instructions, when executed by a processor, causes the processor to determine a clinical image quality of said one or more ultrasound images based at least on said difference between said current ultrasound probe position and said optimal ultrasound probe position. In some embodiments, the instructions, when executed by a processor, causes the processor to identify a plurality of possible probe movements for reducing said difference between said current probe position and said optimal probe position. In some embodiments, the instructions, when executed by a processor, causes the processor to calculate a confidence or probability of improving clinical image quality for each of said plurality of possible probe movements. In some embodiments, the instructions, when executed by a processor, causes the processor to display guidance for said plurality of possible probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof. In some embodiments, said visual indicators for said plurality of possible probe movements are displayed simultaneously. In some embodiments, said visual indicators, said audio indicators, said haptic indicators, or any combination hereof are provided in real-time without time delay.

In some embodiments, said visual indicators, said audio indicators, said haptic indicators, or any combination thereof are configured to convey information regarding said confidence or probability of improving clinical image quality for each of said plurality of probe movements.

In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof. In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the instructions, when executed further cause the processor to provide instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of possible probe movements is independently calculated.

In some embodiments, at least a subset of said plurality of possible probe movements contradict each other. In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the non-transitory computer-readable storage media further comprises instructions that, when executed, cause the processor to receive one or more additional ultrasound images acquired through said ultrasound imaging system after displaying said guidance. In some embodiments, the non-transitory computer-readable storage media further comprises instructions that, when executed, cause the processor to analyze said at least a subset of said one or more ultrasound images or said one or more additional ultrasound images to determine clinical image quality.

In another aspect, described herein are methods for guiding an ultrasound imaging procedure. In some embodiments, the methods can comprise receiving one or more ultrasound images acquired through an ultrasound imaging system. In some embodiments, the methods can comprise evaluating said one or more ultrasound images using a trained machine learning model to determine a difference between current probe position and an optimal probe position for each of a plurality of different target views. In some embodiments, the methods can comprise calculating a confidence or probability of improving clinical image quality for each of a plurality of probe movements for reducing said difference between said current probe position and said optimal probe position for each of a plurality of different target views. In some embodiments, the methods can comprise providing guidance for said plurality of probe movements based on said confidence or probability of improving clinical image quality for each of said plurality of different target views.

In another aspect, described herein are ultrasound systems comprising at least one processor, a memory, and computer executable instructions that, when executed by the at least one processor, causes the processor to receive one or more ultrasound images acquired through an ultrasound imaging system. In some embodiments the instructions, when executed by the at least one processor, cause the processor to evaluate said one or more ultrasound images using a trained machine learning model to determine a difference between current probe position and an optimal probe position for each of a plurality of different target views. In some embodiments the instructions, when executed by the at least one processor, cause the processor to calculate a confidence or probability of improving clinical image quality for each of a plurality of probe movements for reducing said difference between said current probe position and said optimal probe position for each of a plurality of different target views. In some embodiments the instructions, when executed by the at least one processor, cause the processor to provide guidance for said plurality of probe movements based on said confidence or probability of improving clinical image quality for each of said plurality of different target views.

In another aspect, described herein are non-transitory computer-readable storage media encoded with instructions that, when executed by a processor, cause the processor to receive one or more ultrasound images acquired through an ultrasound imaging system. In some embodiments the instructions, when executed by the processor, cause the processor to evaluate said one or more ultrasound images using a trained machine learning model to determine a difference between current probe position and an optimal probe position for each of a plurality of different target views. In some embodiments the instructions, when executed by the processor, cause the processor to calculate a confidence or probability of improving clinical image quality for each of a plurality of probe movements for reducing said difference between said current probe position and said optimal probe position for each of a plurality of different target views. In some embodiments the instructions, when executed by the processor, cause the processor to provide guidance for said plurality of probe movements based on said confidence or probability of improving clinical image quality for each of said plurality of different target views.

In another aspect, described herein are methods for guiding an ultrasound imaging procedure. In some embodiments, the methods can comprise receiving one or more ultrasound images acquired through an ultrasound imaging system. In some embodiments, the methods can comprise evaluating said one or more ultrasound images using a trained machine learning model to determine a difference between a current ultrasound probe position and an optimal ultrasound probe position for each of a plurality of different target views. In some embodiments, the methods can comprise determining a clinical image quality of said one or more ultrasound images based at least on said difference between said current ultrasound probe position and said optimal ultrasound probe position for each of said plurality of different target views. In some embodiments, the methods can comprise identifying a plurality of possible probe movements for reducing said difference between said current probe position and said optimal probe position for each of said plurality of different target views. In some embodiments, the methods can comprise calculating a confidence or probability of improving clinical image quality for each of said plurality of possible probe movements for each of said plurality of different target views. In some embodiments, the methods can comprise displaying guidance for said plurality of possible probe movements based on said confidence or probability of improving clinical image quality for each of said plurality of different target views.

In another aspect, described herein are non-transitory computer-readable storage media encoded with instructions that, when executed by a processor, cause the processor to receive one or more ultrasound images acquired through an ultrasound imaging system. In some embodiments the instructions, when executed by the processor, cause the processor to evaluate said one or more ultrasound images using a trained machine learning model to determine a difference between a current ultrasound probe position and an optimal ultrasound probe position for each of a plurality of different target views. In some embodiments the instructions, when executed by the processor, cause the processor to determine a clinical image quality of said one or more ultrasound images based at least on said difference between said current ultrasound probe position and said optimal ultrasound probe position for each of said plurality of different target views. In some embodiments the instructions, when executed by the processor, cause the processor to identify a plurality of possible probe movements for reducing said difference between said current probe position and said optimal probe position for each of said plurality of different target views. In some embodiments the instructions, when executed by the processor, cause the processor to calculate a confidence or probability of improving clinical image quality for each of said plurality of possible probe movements for each of said plurality of different target views. In some embodiments the instructions, when executed by the processor, cause the processor to display guidance for said plurality of possible probe movements based on said confidence or probability of improving clinical image quality for each of said plurality of different target views.

In another aspect, described herein are ultrasound systems comprising at least one processor, a memory, and a computer executable instructions that, when executed by the at least one processor, cause the processor to receive one or more ultrasound images acquired through an ultrasound imaging system. In some embodiments the instructions, when executed by the processor, cause the processor to evaluate said one or more ultrasound images using a trained machine learning model to determine a difference between a current ultrasound probe position and an optimal ultrasound probe position for each of a plurality of different target views. In some embodiments the instructions, when executed by the processor, cause the processor to determine a clinical image quality of said one or more ultrasound images based at least on said difference between said current ultrasound probe position and said optimal ultrasound probe position for each of said plurality of different target views. In some embodiments the instructions, when executed by the processor, cause the processor to identify a plurality of possible probe movements for reducing said difference between said current probe position and said optimal probe position for each of said plurality of different target views. In some embodiments the instructions, when executed by the processor, cause the processor to calculate a confidence or probability of improving clinical image quality for each of said plurality of possible probe movements for each of said plurality of different target views. In some embodiments the instructions, when executed by the processor, cause the processor to display guidance for said plurality of possible probe movements based on said confidence or probability of improving clinical image quality for each of said plurality of different target views.

Systems and platforms of this disclosure can be configured to perform any combination of method steps described herein. In some embodiments, guidance steps are combined with image-derived EKG steps to enhance the performance of either or both of the guidance instructions and the quality of the image-derived EKG.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE INVENTION

Embodiments of the invention provide for circuitless heart rhythm determination during cardiac ultrasound. In accordance with an embodiment of the invention, different ECGs are acquired contemporaneously with ultrasound imaging of correspondingly different hearts over multiple different heart rhythm (e.g. a heart cycle)s. Different video clips each of one or more image frames of the ultrasound imaging are then annotated with different phases of the heart rhythm occurring contemporaneously with the different image frames as determined from a corresponding one of the ECGs. The annotated frame or frames are then provided to a classifier so as to associate pixel elements of the annotated frame or frames with a correspondingly annotated one of the different phases of the heart rhythm (e.g. a heart cycle). Thereafter, in consequence of the conduct of an ultrasound examination of a target heart, the acquired frame or frames of the target heart can be submitted to the classifier in order to receive in response, a prediction of a contemporaneous phase of the heart rhythm of the target heart based upon the pixel elements of the acquired frame or frames and without the use of one or more sensor pairs of an ECG.

Figure 14:
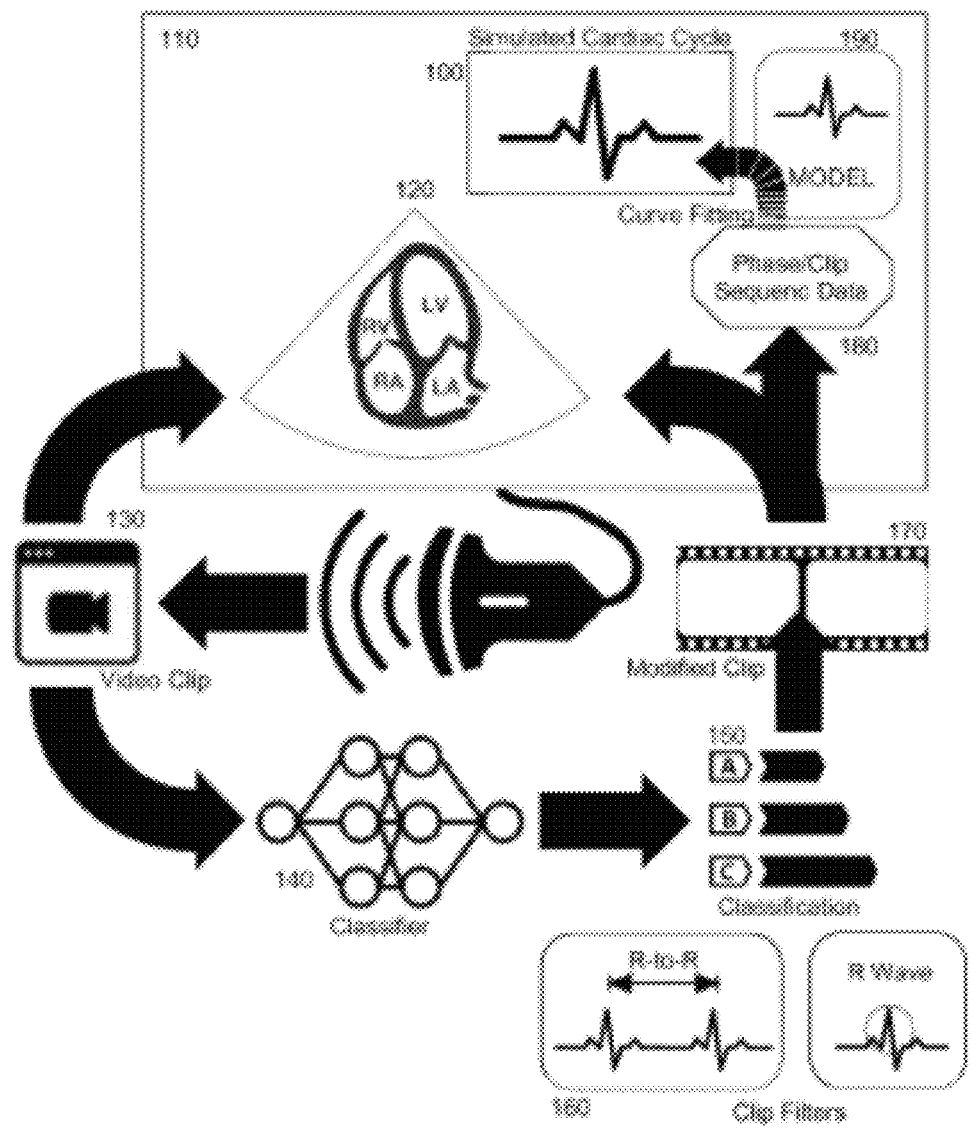
FIG. 14 is a pictorial illustration of a process for circuitless heart rhythm determination during cardiac ultrasound.

In further illustration, FIG. 14 pictorially shows a process for circuitless heart rhythm determination. As shown in FIG. 14, an ultrasound diagnostic imaging device 110 acquires video clip imagery 130 of one or more image frames of a target heart. Thereafter, the device 110 submits the frame or frames of the video clip imagery 130 to a classifier 140. The classifier 140, in turn, processes the individual pixels of the different frames of the video clip imagery 130, and produces a classification 150 of the frame or frames of the video clip imagery 130 as belonging to one of several phases of a heart rhythm (e.g. a heart cycle). The classification 150 may then be presented within a display of the device 110. As well, the classifier 140 produces a set of data points 180 reflective of both a phase determined for a corresponding portion of the frame or frames of the video clip imagery 130 and time sequence values for different ones of the frames in a sequence of the frames of the video clip imagery 130

Once the classification 150 has been determined for the frame or frames of the video clip imagery 130, a modified set of frame or frames 170 can be produced by excluding from the modified frames 170, different ones of the image frames of the video clip imagery 130 with a classification 150 filing outside of a filter 160, such as a filter excluding classifications outside of an R-wave phase of the cardiac cycle, or a classification outside a specific R-to-R portion of the cardiac cycle. The device 110 then presents a display 120 of the modified frames 170 in the device 110. As well, as an option, the data points 180 from the video clip imagery 130 are fit against an ECG model 190 to produce a simulated ECG display 100 for presentation in the device 110.

Figure 15:
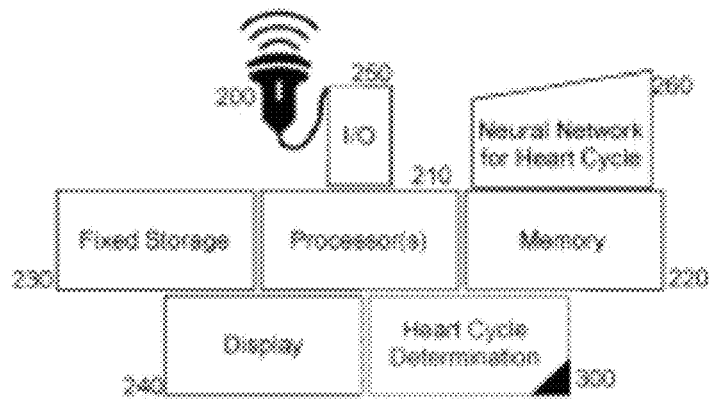
FIG. 15 is a schematic diagram of a data processing system adapted for circuitless heart rhythm determination during cardiac ultrasound; and, FIG. 16 is a flow chart illustrating a process for circuitless heart rhythm determination during cardiac ultrasound.

The process described in connection with FIG. 14 may be implemented within a computer data processing system. In further illustration, FIG. 15 schematically shows a data processing system adapted for circuitless heart rhythm determination. The system includes a host computing platform that includes one or more computers, each with at least one processor 210, memory 220, fixed storage 230 and a display 240. The fixed storage 230 stores therein one or more frames of respective ultrasound video clips of a target heart acquired by input/output circuitry 250 communicatively coupled to an ultrasound diagnostic imaging device 200.

A neural network 260 may be loaded at run time into the memory 220 of the host computing platform. The neural network 260 is trained to correlate different imagery of different image frames of different video clips of different hearts with different cardiac cycle phases so that when the neural network 260 is presented with a contemporaneously acquired set of frames of a video clip of the target heart, the neural network 260 returns a correlated cardiac cycle phase such as P-wave, R-wave or T-wave. Likewise, the neural network 260 is trained to correlate different image frames of different video clips of different hearts with corresponding classification data points so that when the neural network 260 is presented with the contemporaneously acquired frame or frames of a video clip of the target heart, the neural network 260 also returns a correlated sequence of classification data points which may then be curve fit into a simulated ECG.

Of note, the system yet further includes a heart rhythm determination module 300. The heart rhythm determination module 300 includes computer program instructions that when executing in the memory 220 by the one or more processors 210 of the host computing platform, loads into the memory 220 the neural network 260 and receives a continuous stream of different frames of respectively different video clips, either previously acquired and stored in the fixed storage 230, or contemporaneously acquired in real time from the ultrasound diagnostic imaging device 200, and submits the frames of the video clips in succession to the neural network 260. Thereafter, the program instructions receive from the neural network 260 in response, a classification of each of the frames of the video clips as to a corresponding phase of the heart rhythm and sequencing data for the classification. The program instructions then curve fit the sequenced data against a known model of an ECG in order to produce a simulated ECG that can be displayed in the display 240.

As well, the program instructions extract from the frame or frames of the video clip, portions of the frames of the video clips having been classified outside of a specified filter. By way of example, a filter can exclude any frame or frames of the video clip imagery classified outside of an R-wave portion of the heart rhythm or video clip imagery classified as falling outside of a threshold number of R-to-R heart rhythm (e.g. a heart cycle)s. Optionally, the program code extracts from the frame or frames of the video clip, all frames associated with portions of the heart rhythm outside of a single complete R-to-R cycle and then displays a looping presentation of the remaining frame or frames of the video imagery in the display 240.

Figure 16:
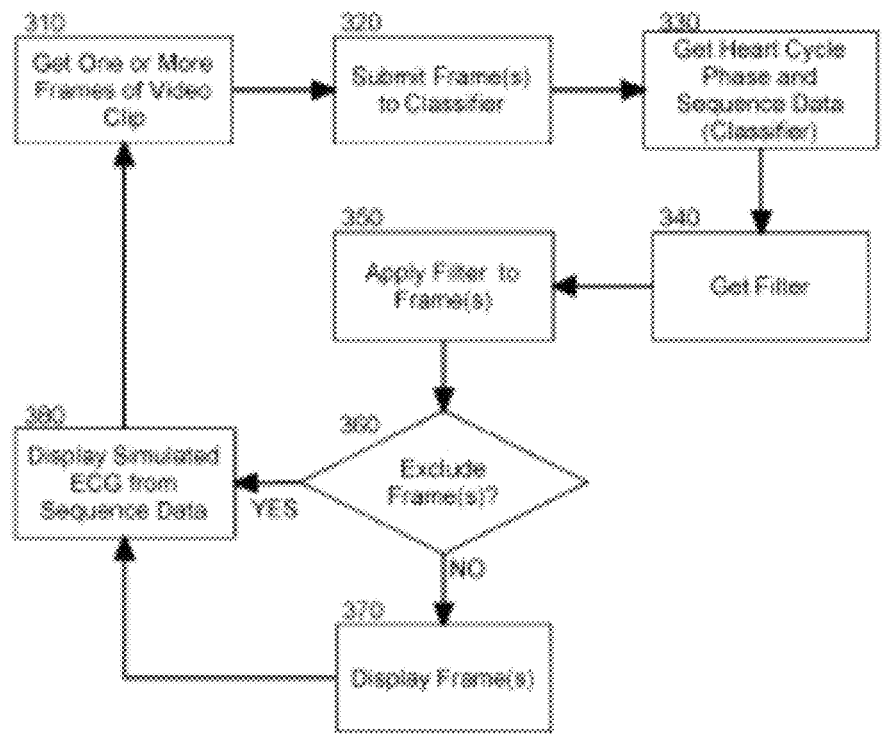

In even yet further illustration of the operation of the heart rhythm determination module 300, FIG. 16 is a flow chart illustrating a process for circuitless heart rhythm determination. Beginning in block 310, a video clip of one or more image frames is received from an ultrasound diagnostic imaging device and in block 320, the received frame or frames is submitted to a classifier. In block 330, both a heart rhythm phase, and also sequencing data of different frames and corresponding classifications are received from the classifier. Then, in block 340, a filter is retrieved and in block 350, the filter is applied to the frames in order to exclude from display those of the frames classified as being outside of the filter based upon an association with a particular portion of the heart rhythm phase. As such, in decision block 360, it is determined whether or not to exclude the frame or frames from display in the ultrasound diagnostic imaging device.

If it is determined not to exclude the frame or frames from display in the ultrasound diagnostic imaging device, the frame or frames is displayed in the ultrasound diagnostic imaging device in block 370. In either circumstance, however, in block 380 the sequencing data is fitted with a model ECG graph in order to produce a simulated ECG which then is displayed in the ultrasound diagnostic imaging device. Thereafter, the process repeats for a next received video clip. In this way, the heart rhythm determination association with each frame of the video clip can be used in order to determine which of the frames of the video clip to exclude from view in so far as higher quality image frames are correlated to certain phases of the heart rhythm (e.g. a heart cycle).

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Disclosed herein are platforms, systems, and methods for providing ultrasound guidance comprising multiple instructions for obtaining improved or optimal image quality. The multiple instructions are provided in a manner that addresses technical challenges in AI-based ultrasound guidance.

The improvements disclosed herein capture the knowledge of expert sonographers. Specifically, sonographers understand the anatomical structures or features they see in an ultrasound image as well as the diagnostic quality of the image, and how and where to move the ultrasound probe to acquire the desired imagery based on the current ultrasound imagery. The platforms, systems, and methods disclosed herein utilize machine learning techniques such as deep learning to capture this perceptual ability in order to empower much broader range of clinical users including non-specialists to acquire high-quality ultrasound imaging, particularly for echocardiograms.

Deep learning is a form of machine learning based on artificial neural networks. Deep learning refers to a number of techniques, but common attributes include composing simple computational elements into a layer, composing many layers into deep stacks, and adapting the parameters of the elements using supervised learning.

In order to allow non-expert users to acquire high-quality echocardiograms, the algorithms disclosed herein estimate the positioning of the ultrasound probe and provide real-time guidance based on that estimation for the user to arrive at the ideal positioning that produce desired imagery. In addition, an algorithm or model can be used to grade the quality of the imagery and determine whether it meets diagnostic purposes (which may depend on the type of ultrasound imaging procedure or targeted view) and is therefore suitable for capturing and/or saving for downstream analysis.

Figure 1:
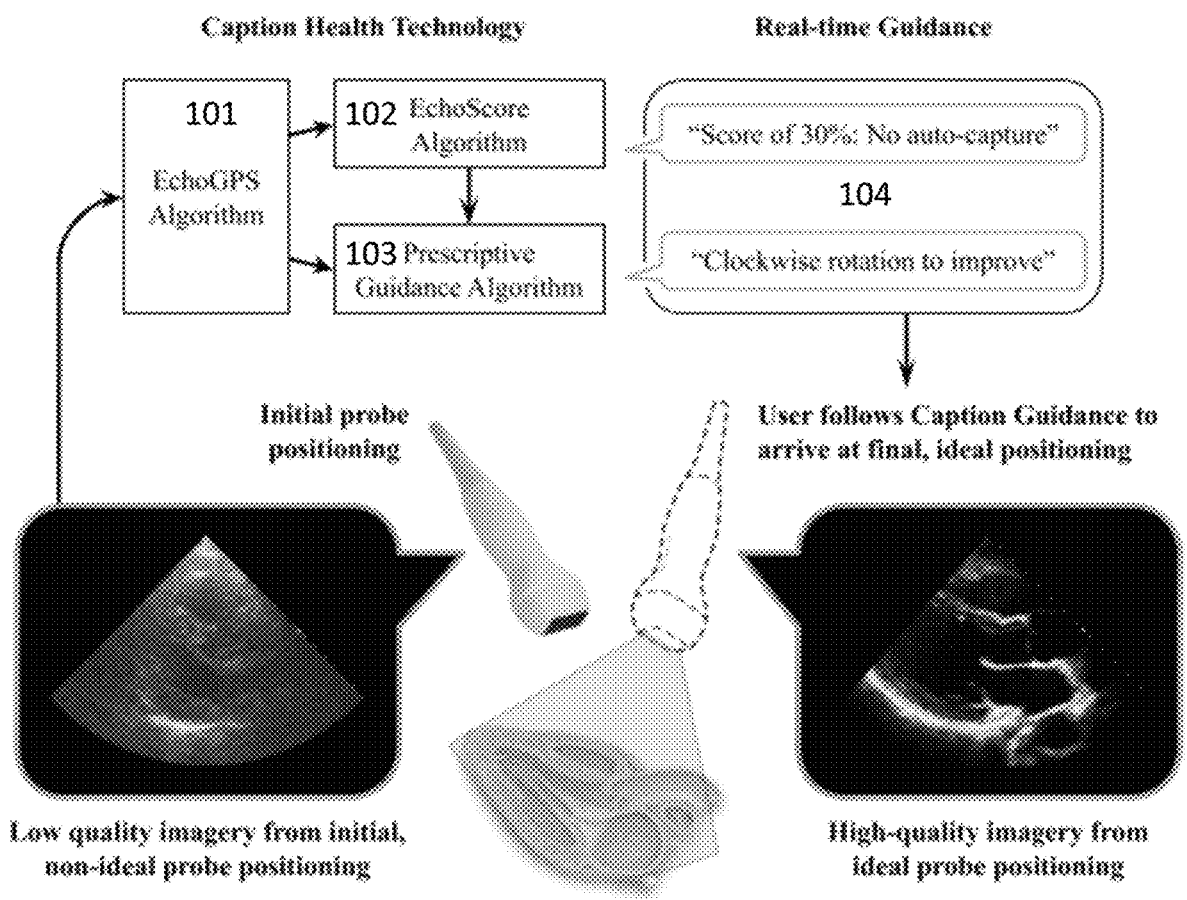
FIG. 1 shows components of a workflow for evaluating ultrasound images using a positioning algorithm ("EchoGPS"), a quality algorithm ("EchoScore"), and a guidance algorithm ("Prescriptive Guidance")

Accordingly, disclosed herein are platforms, systems, and methods comprising one or more algorithms for evaluating ultrasound images to provide real-time guidance. In some embodiments, the one or more algorithms comprise a probe positioning algorithm configured to estimate probe positioning relative to an ideal anatomical perspective ("probe positioning features") as well as the physical distance between the estimated and ideal probe positioning from the ultrasound imagery. The output generated by the probe positioning algorithm may be analyzed or utilized by one or more downstream algorithms. In some embodiments, the one or more algorithms comprise a scoring algorithm configured to generate a computational output such as a metric or score based on the probe positioning distance. The scoring algorithm may convert the probe positioning distance into a normalized score, for example, that is proportional to the proximity between the estimated probe positioning and the ideal probe positioning, which can be used to provide real-time feedback on the quality or correctness of probe positioning. For example, the normalized score may be utilized for features such as retrospectively saving the best imagery over time and automatically capturing imagery once the score becomes sufficiently high for diagnostic purposes. In some embodiments, the one or more algorithms comprise a guidance algorithm configured to estimate probe manipulations or movements that would improve the geometry of the probe positioning for a given desired canonical view of the anatomy. The guidance algorithm may utilize the probe positioning estimated by the probe positioning algorithm and/or the positioning score calculated by the scoring algorithm. The output of the guidance algorithm can be used to determine the specific instructions to provide to the user for how to manipulate the probe. These algorithms operate together to provide real-time guidance to ultrasound the user: even a non-specialist user may follow prescriptive guidance and optimize the positioning score to get a point where the diagnostic quality is achieved and the corresponding ultrasound images are captured automatically. FIG. 1 provides an overview of an illustrative and non-limiting embodiment of this workflow. The non-specialist user frequently encounters non-ideal probe positioning. The ultrasound guidance workflow can include a positioning algorithm ("EchoGPS") 101 to estimate the positioning relative to the ideal, based on input imagery. A scoring algorithm ("EchoScore") 102 may be used to calculate a quality metric or score based on the positioning generated by the positioning algorithm. A guidance algorithm ("Prescriptive Guidance") 103 can then be used to produce probe navigational guidance 104 for reducing the difference between the current positioning of the probe and the ideal positioning Algorithms then produce real-time guidance. This guidance can be presented to the user via a user interface in real-time to provide timely guidance for the user to improve image quality. This process may be repeated to arrive at the final, ideal positioning that produces diagnostic quality echocardiogram. In some cases, images that successfully achieve diagnostic quality are captured automatically during this process.

Diagnostic Image Quality

A particular challenge in ultrasound medical imaging is accurately determining what probe pose or movement will result in a clinical or diagnostic quality image. As used herein, an image quality (e.g. diagnostic quality or clinical quality) may be used to refer to one or more aspects of the quality of an image. In some embodiments, image quality is in reference to an image that can be viewed by a trained expert or a machine learning tool in a way that anatomy is identified and a diagnostic interpretation can be made. In some embodiments, image quality is in reference to an image in which the targets are displayed in a clear and well-defined manner, for example, where extraneous noise or clutter is minimal, the grayscale display shows subtle variations of tissue type and texture, blood flow signals are clear and distinct, frame rates are high, providing accurate depiction of tissue or blood flow movement, borders between tissue types or blood flow and vessel or other structures are well resolved, ultrasound artifacts such as grating and side lobes are minimized, acoustic noise is absent, places to make measurements in the image are obvious and distinct, or any combination thereof depending on the nature of the ultrasound exam. In some embodiments, image quality is in reference to an image that contains the necessary anatomical targets to represent a standard diagnostic view. For example, an Apical Four Chamber view of the heart should show the apex of the heart, the left and right ventricles, the myocardium, the mitral and tricuspid valves, the left and right atria, and the interatrial septum. As another example, a long axis view of the carotid artery at the bifurcation should show the common, external, and carotid artery and the carotid bulb. In some embodiments, image quality is in reference to an image in which a diseased condition, abnormality, or pathology is well visualized. For example, medical images may be labeled by cardiologists, radiologists or other healthcare professionals according to whether they are considered to have a well visualized diseased condition, abnormality, or pathology, and then used to train a machine learning algorithm to differentiate between images based on image quality.

In some embodiments, image quality means that some combination of these aforementioned characteristics is present. Effective navigational guidance will need to be provided to ensure the captured ultrasound image satisfies the combination of these image quality characteristics necessary to yield an overall clinical or diagnostic quality image because, in ultrasound imaging, patient presentations can present challenges to obtaining high-resolution, low-noise images. It can be particularly challenging, for example, when trying to evaluate blood flow in the kidney of an obese agent, to get a strong enough blood flow Doppler signal because the kidney is so deep underneath fatty tissue. In a patient who has been a long-term smoker, lung disease can make it very difficult to obtain high quality cardiac images. These conditions are extremely common, and in such situations, image quality can mean an image that may be sub-optimal as far as noise and resolution, but still provides enough information for a diagnosis to be made. In a similar way, patient presentations and pathologies can make it impossible to obtain views that show all the anatomical components of a standard, canonical image. For example, a technically difficult cardiac patient may make it impossible to get an Apical Four Chamber view with all four chambers well defined, but if some images show, say, the left ventricle well, this can be considered a quality image because many critical diagnostic conclusions can be drawn from only that.

In some embodiments, the anatomical views used in the present disclosure include one or more of a probe position or window, an imaging plane, and a region or structure being visualized. Examples of probe position or window include parasternal, apical, subcostal, and suprasternal notch. Examples of imaging plane include long-axis (LAX), short-axis (SAX), and four-chamber (4C). Examples of the region or structure being visualized include two-chamber, aortic valve, mitral valve, etc. For example, the anatomical views can include parasternal long-axis (LV inflow/outflow), RV inflow+/−RV outflow, parasternal short-axis (aortic valve level, mitral valve level, papillary muscle level, apical LV level), apical four-chamber, apical five-chamber, apical two-chamber, apical three-chamber, subcostal four-chamber view, subcostal short-axis and long-axis, suprasternal long-axis (aortic arch) and suprasternal short-axis (aortic arch).

Ultrasound Guidance

Disclosed herein are platforms, systems, and methods that provide navigational guidance to users to instruct them how to hold and manipulate the probe in order to get diagnostic or clinical quality images sufficient to make medical and/or diagnostic decisions. The conditions and the nature of ultrasound imaging create various problems for navigation assistance ultrasound technologies. Methods for providing guidance to users for ultrasound acquisition are faced with the image quality challenges listed above in order to provide high quality images sufficient to draw medical diagnoses or conclusions. One technical challenge is the guidance must function in real-time at sufficiently high frame rates to enable effective navigational guidance to the user (e.g. as high as 60 frame per second or higher). Another challenge is the guidance needs to function effectively while the user is moving the probe in a variety of manners and directions such that the image is rapidly changing. Another challenge that frequently arises is providing effective navigational guidance despite the ambiguity of suboptimal images acquired during the ultrasound imaging procedure, where a human expert or a machine learning tool may not always be able to recognize the structures. There may often be multiple movements that a user should make in order to get a quality image of a particular target. For example, the user may be trying to image the aortic valve from the parasternal window. The movements needed to obtain a diagnostic or clinical quality image might include rotating the probe counterclockwise, sliding the probe up on the patient, and rocking the probe towards the index marker on the probe. Providing instructions on all of these possible movements, in a coherent and usable manner, when the user is at the same time moving the probe in correct or incorrect ways is difficult. This difficulty is amplified by the fact that the movement guidance instructions estimated by a guidance algorithm inevitably contain some uncertainly and error. There may even at times be multiple legitimate guidance calculations that are estimated simultaneously even though they contradict one another. For example, a particular structure or view may be achieved by rotating the probe clockwise, or it may be achieved by rotating the probe counterclockwise. Whether one path is better than another can change rapidly based on such things as, patient breathing, patient movement, heart motion, blood vessel pulsations, or the user moving the probe. Collectively, these challenges significantly reduce the effectiveness of ultrasound navigation methods.

Accordingly, the platforms, systems, and methods disclosed herein provide navigational guidance to users for probe movement and/or manipulation for obtaining diagnostic or clinical quality images. In particular, in certain embodiments, the navigational guidance is improved through an omnidirectional guidance feature that compensates and/or mitigates potentially contradictory and/or fluctuations in navigational guidance that can arise due to any of the above-mentioned technical challenges. One advantage provided by the present disclosure is the provisioning of navigational guidance when there are multiple movements at one time that can be made. Another advantage is providing navigational guidance when the image is rapidly changing because of constant and unpredictable patient movement, tissue movement, probe movement by the user, or any combination thereof. Another advantage is providing navigational guidance when there is substantial uncertainty or the navigation tool cannot fully overcome uncertainty or erroneous movement instructions. Another advantage is providing real-time probe movement instructions to users in a manner that addresses these problems but produces user feedback that is smooth, logical, and not distracting or confusing.

In some cases, when multiple instructions may be needed, the most important movement instruction (e.g., having the highest likelihood or probability of improving image quality) is selected and provided to the user. The selection of which one, or alternatively a subset such as two or three, of several viable movements should be displayed to the user can be determined by evaluating a time sequence of ultrasound frames, and determining which guidance movement instruction occurs most frequently. For example, the device could collect two seconds worth of image frames at a frame rate of 60 fps for a total of 120 frames. If the "Rotate Clockwise" instruction is determined to be the appropriate movement guidance instruction 100 times and the "Slide Medially" instruction is calculated 20 times, the "Rotate Clockwise" instruction would be displayed as the instruction that was calculated most frequently within the time frame. This time frame can be a certain time duration during which a plurality of movement instructions are evaluated to determine the specific instruction to be displayed. Alternatively, the plurality of movement instructions may be evaluated based on a certain number of the most recent frames. For example, the most important instruction may be selected based on evaluation of the most recent plurality of movement instructions such as the most recently captured 120 image frames. The duration and/or the number of frames used for this selection of the most important instruction can be set at a number that provides satisfactory smoothing of the guidance instructions. Then, once the most important probe movement has been made, the next most important movement instruction may be provided to the user (e.g., via a user interface such as a digital display integrated into a handheld ultrasound device or on a separate display communicatively coupled to the ultrasound device), and the process is repeated until a quality image is obtained.

In some cases, when the image is rapidly changing because of constant and unpredictable patient movement, tissue movement, or probe movement by the user, a specific movement instruction is provided through the user interface for a minimum duration. Without this, different instructions could flash up on the screen many times a second, or be provided audibly or through haptic feedback, thereby producing confusing, distracting, and unusable feedback to the user. In some cases, the specific movement instruction may be configured to occur over a set period of time or a minimum period of time (e.g., a minimum threshold). In some cases, the movement instruction occurs over some number of sampling instances.

In some cases, to address the problem that the navigation tool cannot fully overcome uncertainty or erroneous movement predictions, a threshold measurement is used to only display movements instructions to the user that pass the threshold. For example, a certain threshold number or threshold duration of a particular movement instruction for improving diagnostic or clinical image quality may be required (out of a total number or total duration of sampling instances) before the instruction is displayed to the user in order to avoid confusing the user. Therefore, to provide user feedback that is smooth, logical, and not distracting or confusing, one approach is to use a threshold to select a single movement most likely to overcome an image quality deficiency, require that such a movement meet a threshold amount or value to be passed to the user, not provide other movement possibilities to the user simultaneously, and apply a time filter (e.g., a minimum time duration) or number filter (e.g., a minimum number of images) to ensure a defined movement has been identified and is persisting. As shown in the illustrative flow chart in FIG. 2A, the single view threshold-based process includes the steps of image acquisition 201, probe position guidance detection or determination 202 (e.g., using the algorithms shown in FIG. 1), detecting at least one corrective movement to obtain the clinical quality image from the current probe position 203, determining if the detected probe position guidance movement instruction meets a certain threshold or requirement 204, comparing multiple probe position guidance movement instructions to determine which instruction is detected over a threshold level more than other instructions 205 (e.g., a particular movement instruction is determined to be the corrective movement for obtaining the clinical quality image most frequently during a certain time window or duration), and present the one probe position guidance movement instruction 206.

Figure 2A:
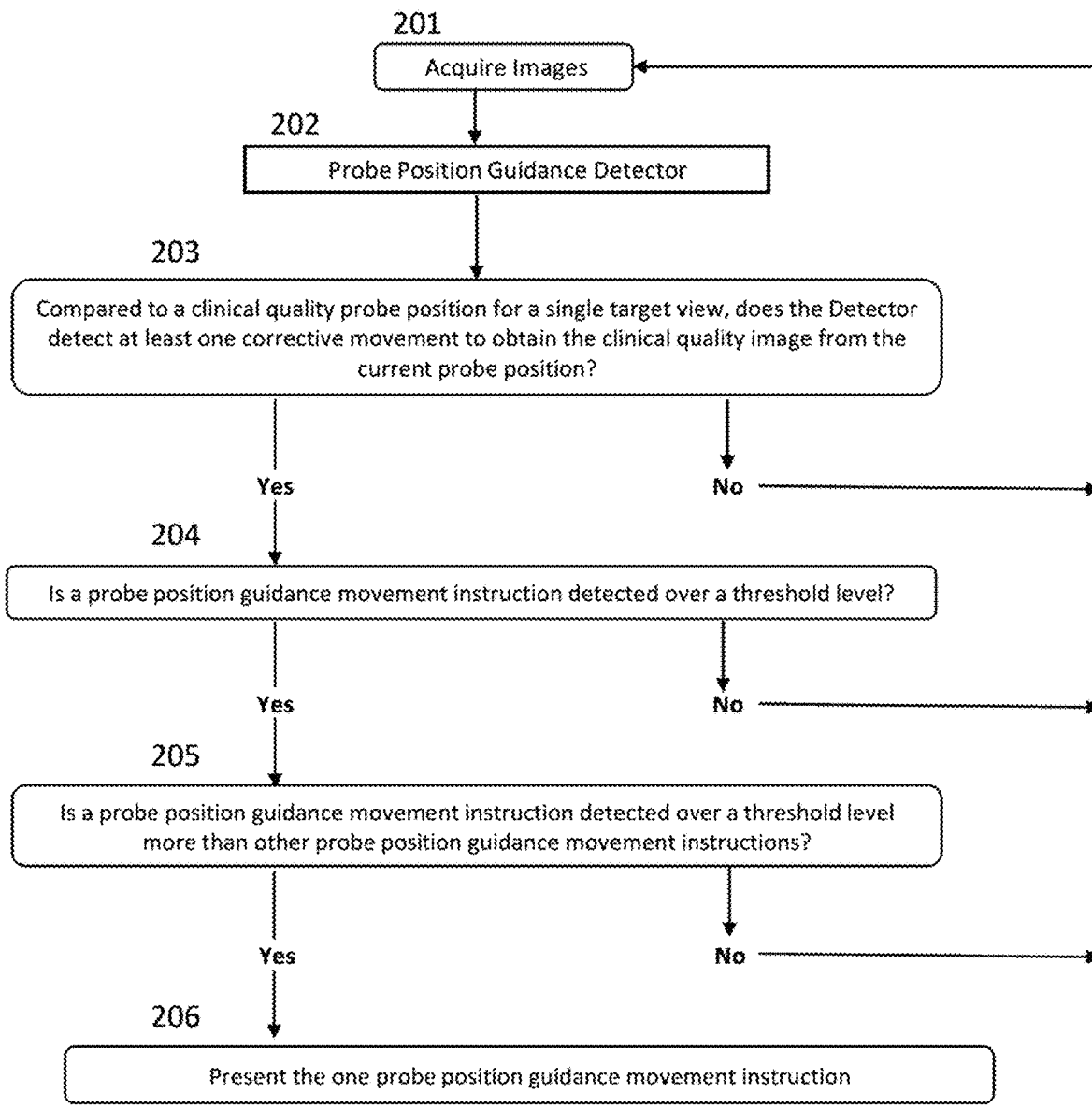
FIG. 2A provides a flow chart of a process for presenting a single probe movement instruction for achieving a single target view using a threshold.
Figure 2B:
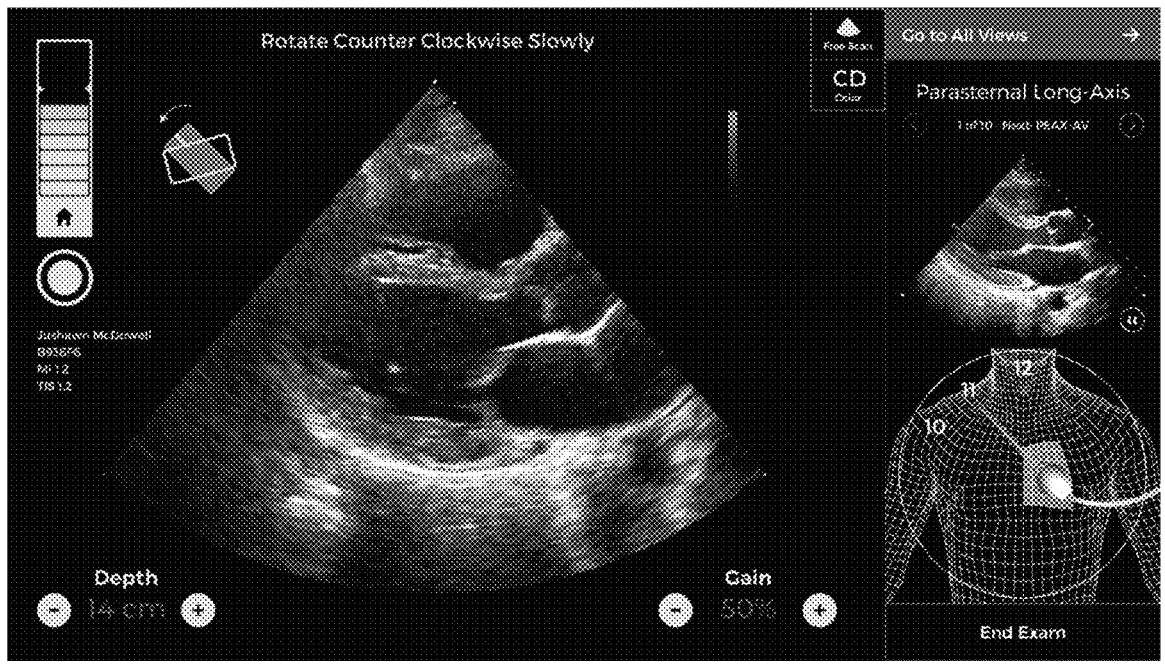
FIG. 2B shows an illustrative interface providing guidance feedback for a single movement based on the threshold and time or number filter as delineated in the flow chart of FIG. 2A.

FIG. 2B shows an illustrative interface providing smoothened guidance feedback for a single movement based on the threshold and time or number filter as delineated in the flow chart of FIG. 2A. In this illustration, the image the user is trying to obtain is a parasternal long axis view of the heart. The navigation software has determined that the user is relatively close to an acceptable image. The user is informed of this by the quality meter in the upper left corner of the screen. The two triangular tick marks on the meter represent a reliably diagnostic image. The multiple horizontal bars approach the tick marks and change colors (e.g., turn green) to indicate that the image is good and close to reliably diagnostic. The probe movement instruction that has been determined to best most appropriate to improve the image is that the user should rotate the probe counter clockwise slowly. This is displayed as a text message and in the form of an icon. Note that just one instruction is provided to the user at a time. In this implementation, the instruction is designed to change only after a probability threshold and timing filter are met.

This method may arrive at this single instruction by using an image processing or machine learning model that compares the current image to a desired image. It may use an anatomical model of the spatial relationship of the deficient current image to the desired optimal image to determine probe movement instructions. It may use a model that correlates the current deficient image probe position to the probe position of the desired optimal image to determine probe movement instructions. These estimates will produce multiple possible instructions. These include different movement types that are compatible with getting a good image, but can also include contradictory movements that the model can't disambiguate. A threshold is applied to select one instruction that achieves the highest confidence level of the various possibilities returned by an algorithm. This class of instruction then is held for presenting to the user pending a continual monitoring of the image to confirm over some number of instances, such as a frame, number of frames, time period, or number of sampling instances, that the instruction is accurate. Feedback can be visual, such as a text display, graphical icon, or audible, or haptic.

The current navigation solutions are insufficient to address the particular technical problems recognized in the instant disclosure because they only provide one instruction at a time or only a limited number of instructions, which can result in certain technical challenges in providing suitable instructions to the user. The limitation on instructions shown to the user may utilize a threshold to decide which of one or a limited number of instructions to display to the user. There may be a delay in displaying instructions to users because a time filter is used to avoid rapidly flashing different instructions to users. If multiple instructions are provided without using thresholding, or instructions without using time filters, then the feedback would be unusable or difficult to interpret. For example, there would be rapidly appearing and disappearing or changing text messages or graphic icon changes (or other guidance instructions/indications) as the probe is moved and captures numerous images, some of which are of low quality and therefore produce low quality calculated navigational guidance instructions.

By contrast, the platforms, systems, and methods disclosed herein provide for improved navigational guidance that overcomes the limitations of previous approaches. In one aspect, the guidance utilizes a threshold that looks for a probe movement instruction to occur over a period of time or a number of computations to select among multiple alternatives that may or may not be used, or may be adjustable. The guidance for probe navigation or movement instructions can be instantaneously provided to the user in real-time as they are operating the ultrasound probe. In some cases, the guidance for multiple probe movements are provided simultaneously. The guidance may include feedback or additional information on probe movement instructions that have differing probabilities of being accurate, even ones that contradict each other. The guidance may be presented via a graphical method that minimizes distracting visual information. The graphical display may incorporates a plurality of movement instructions in an intuitive manner. In some cases, the display uses one of several methods to inform the user of the confidence level or importance of the various movements. For example, the confidence level or importance of one or more movements (e.g. corresponding to improvement in image quality expected to be obtained through the movement) can be graphically represented with increasing or decreasing screen brightness (e.g. increased brightness for higher confidence movements), colors (e.g. red for low, yellow for intermediate, and green for high likelihood of being accurate), or it could be with different types of graphical filling or markers (e.g. the graphical density of filling in an icon). Different parts of the guidance graphic could pulse or flash to indicate movement. Colors and icons could be of varying transparency and these parameters may change as the user moves to the correct position, for example, the colors and icons could solidify as the probe approaches the correct position. In some cases, the navigational guidance comprises instructions or contextual information not strictly related to probe movements, such as patient breathing or body position instructions, or ultrasound system setting instructions such as depth or gain. In some cases, the instructions do not have thresholds correlated with image quality.

In some cases, the ultrasound navigation device is configured to provide many types of probe movement instructions, and other scanning instructions. Examples of instructions include such pose changes as: rotate the probe clockwise or counterclockwise, slide (translate) the probe up towards the patient's head, down towards the patient's feet, laterally towards the patients side, medially towards the patient's midline. Instructions can include telling the user to tilt the ultrasound beam up towards the head, down towards the feet, laterally or medially. This instruction can also be provided in relationship to the back or "tail" of the physical probe. For example if the instruction calls for the beam to be aimed up towards the head, the instruction could be to move the probe tail down. In some cases, the probe comprises an index marker (e.g., on one side). This can correspond to a graphical display on one side of the image on the screen. Accordingly, the user can be instructed to rock the probe towards this marker or away from this marker. The user can also be instructed to apply more or less pressure to the probe as it is pressed against the patient.

Other instructions not strictly related to probe position may be provided, including ultrasound acquisition parameters such as changing the scanning depth of field setting or increasing or decreasing image gain. In some cases, patient instructions are provided, for example, instructions for the patient change their breathing pattern or to move or adjust the patient's body or body positioning.

Figure 3:
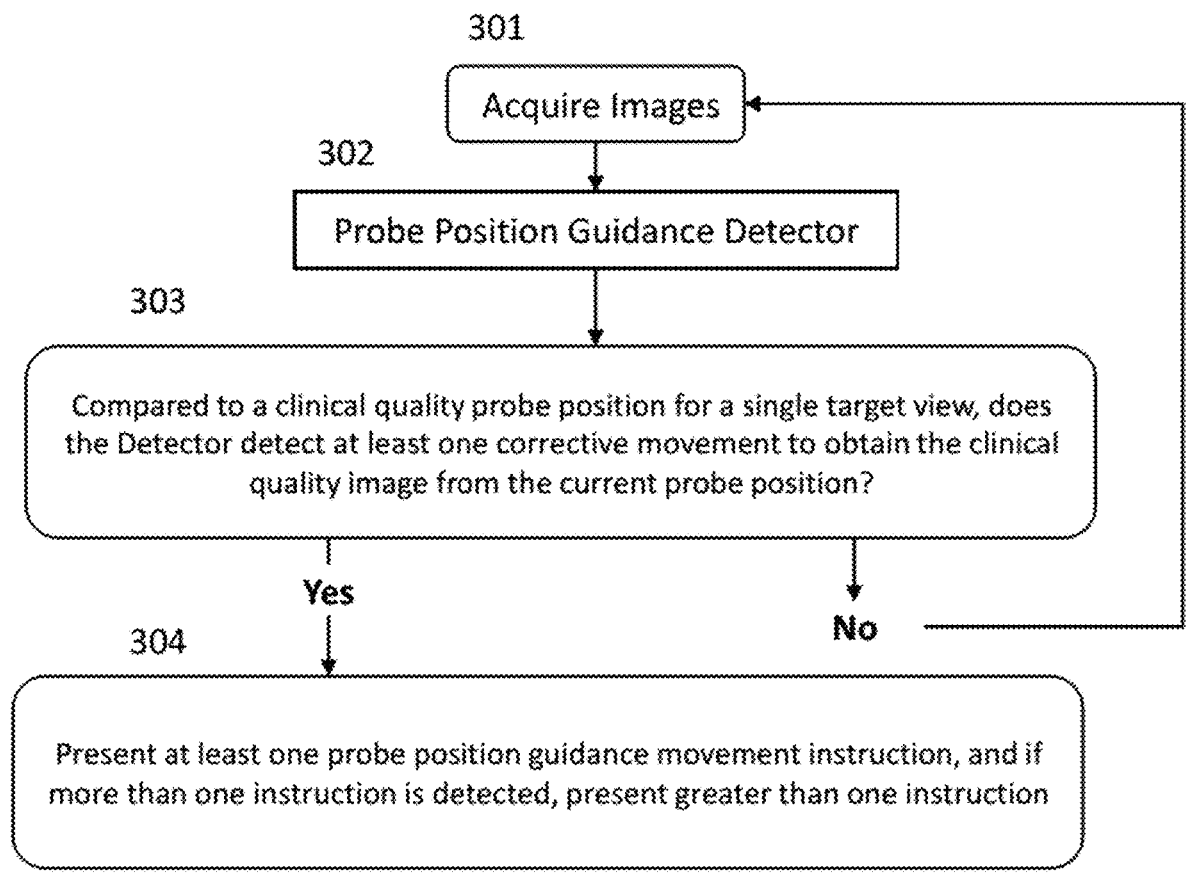
FIG. 3 provides a flow chart of a process for presenting one or more probe movement instructions for achieving a single target view.

FIG. 3 shows an illustrative flow chart for one or more probe position guidance movement instructions for achieving a single target view. After image acquisition by the ultrasound probe 301, the probe position guidance is determined or detected 302. Compared to a clinical quality probe position for a single target view, it is determined whether the probe position guidance detector detects or determines at least one corrective movement to obtain the clinical quality image from the current probe position 303. Next, the one or more probe position guidance movement instructions that are determined in the previous step 303 are presented to the user to provide navigational guidance of the probe for the single target view 304.

Figure 4:
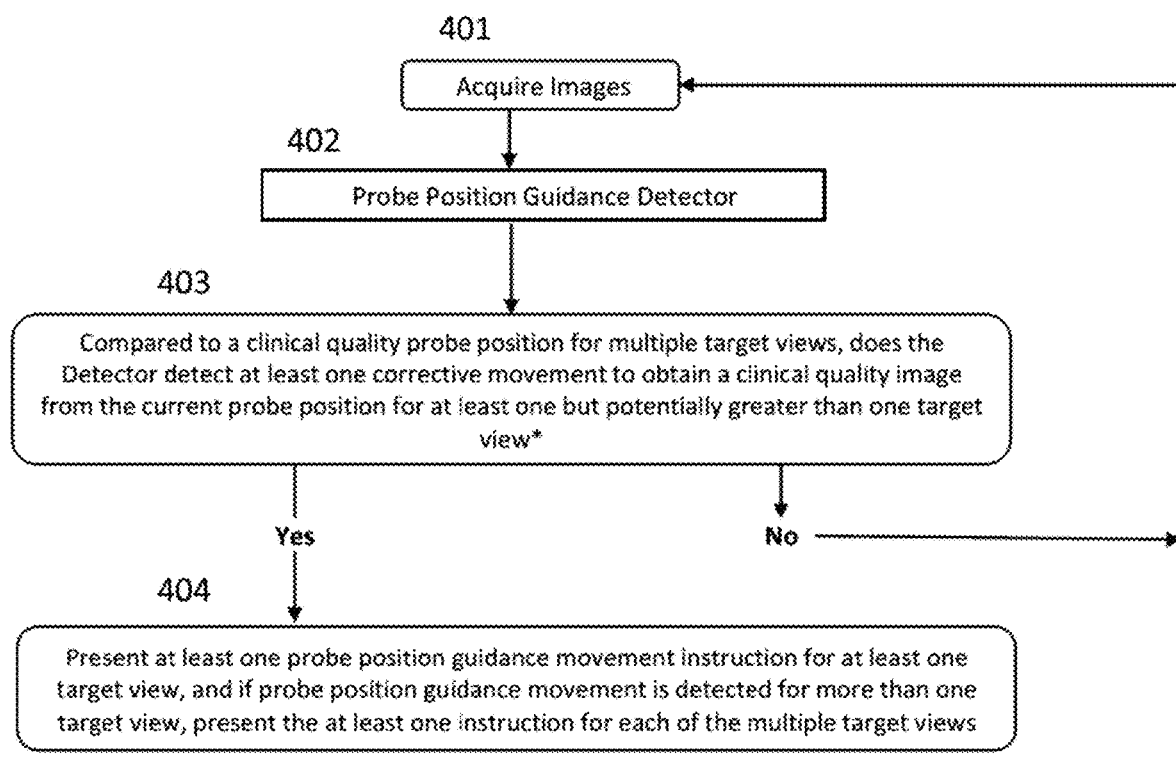
FIG. 4 provides a flow chart of a process for presenting one or more probe movement instructions for achieving each of multiple target views.

FIG. 4 shows an illustrative flow chart for one or more probe position guidance movement instructions for achieving multiple target views. After image acquisition by the ultrasound probe 401, the probe position guidance is determined or detected 402. Compared to a clinical quality probe position for multiple target views, it is determined whether the probe position guidance detector detects or determines at least one corrective movement to obtain the clinical quality image from the current probe position 403 for at least one but potentially multiple target views. Next, the one or more probe position guidance movement instructions that are determined in the previous step 403 are presented to the user to provide navigational guidance of the probe for at least one or a plurality of the multiple target views 404.

Figure 5:
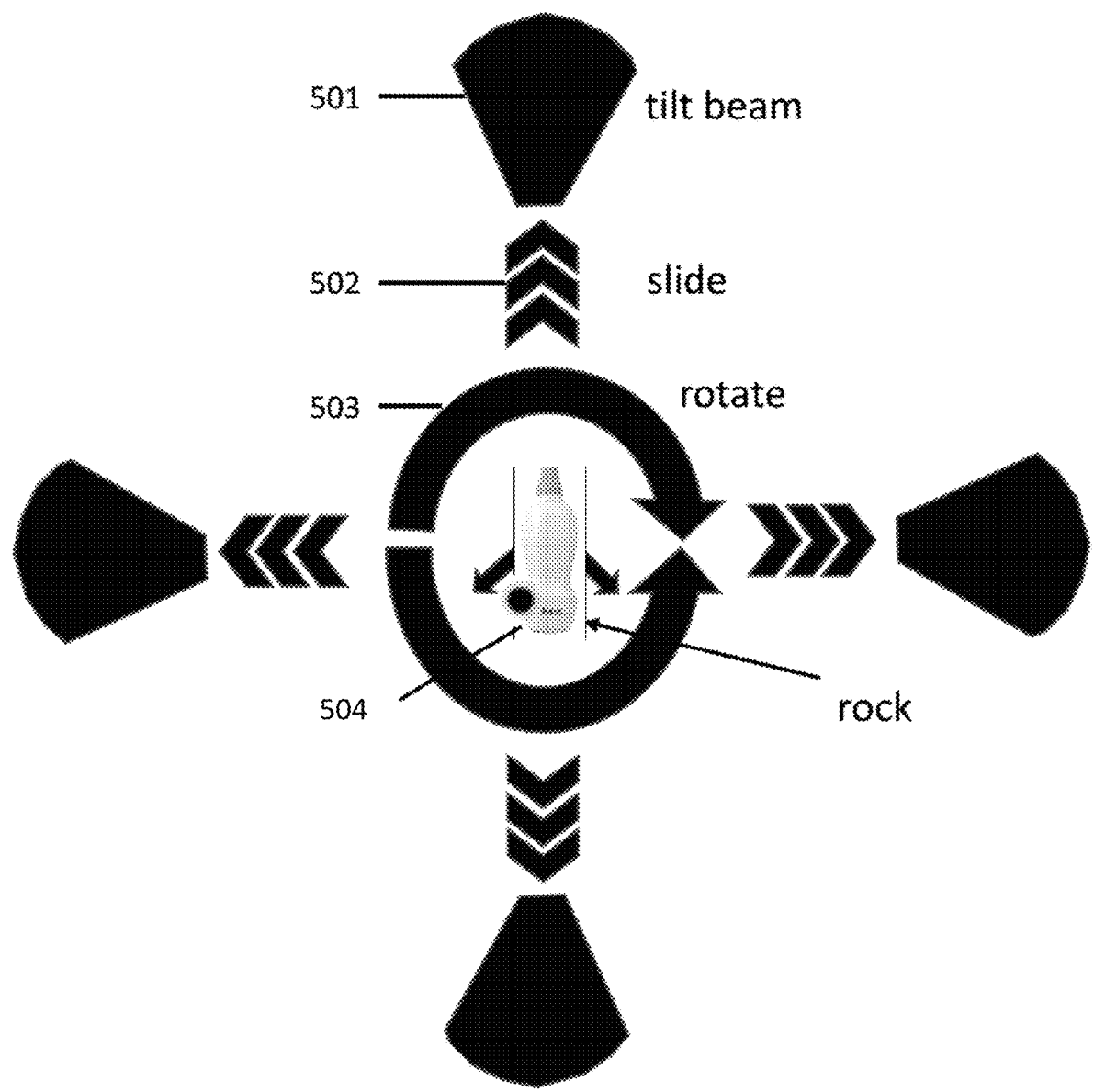
FIG. 5 shows visual indicators for probe movement instructions providing guidance towards a single target view.
Figure 6:
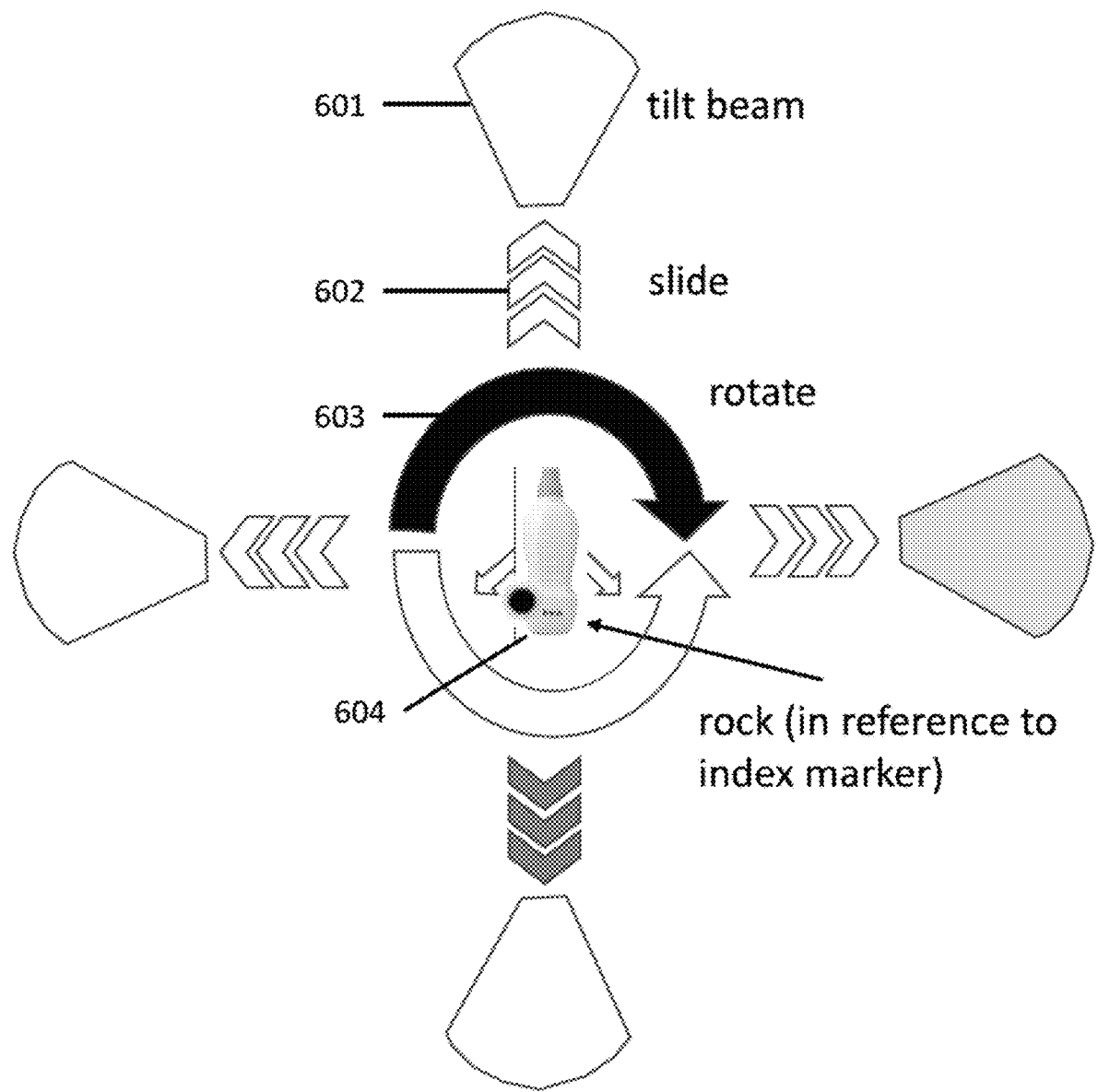
FIG. 6 shows graphic variations of visual indicators for probe movement instructions providing guidance towards a single target view.

FIG. 5 provides a non-limiting, illustrative example of how a navigational instruction graphical display may appear for guiding towards a single target view, according to some embodiments. As shown, the graphical display contains the four main movements, tilt beam 501 (towards head, towards feet, lateral or medial), slide 502 (up, down, lateral medial), rotate 503 (clockwise, counter clockwise), and rock 504 (towards probe index marker, away from probe index marker). While FIG. 5 is shown with all the movement indicators in the same color, they could have different colors, different brightness levels, different filling types, or any combination thereof to show importance. Dynamic graphical features may be included, for example, the movement indicators may pulsate or fade in relation to the estimated importance or likelihood computed for the corresponding navigational guidance movement. One or more of the instruction components could be changing rapidly, continuously, and without delays, and this unique combination of multiple navigational movement instructions being presented simultaneously together with indicators of their respective importance provides a coherent interface that enables a user to efficiently understand the navigational options that are available and therefore make fast and accurate decisions in adjusting probe movement. FIG. 6 shows another non-limiting illustration of a navigational instructional graphical display. In this example, a black and white version of the graphical display is shown. In this illustrative example, the graphical display contains shaded icons depicting the four main movements, tilt beam 601 (towards head, towards feet, lateral or medial), slide 602 (up, down, lateral medial), rotate 603 (clockwise, counter clockwise), and rock 604 (towards probe index marker, away from probe index marker), where the darkness of the icon fill reflects a higher ranking in terms of priority of making the movement. Accordingly, rotate clockwise would be the most important move, followed by slide down, followed by tilt the beam to the right. While the illustration is in black and white, such information can also be conveyed by any alternative methods disclosed herein such as through modulating the visual movement indicators to be shown in various colors according to a priority ranking.

Additional information may be added, including non-movement instructions. For example, an icon may represent patient breathing state or pressure on the probe against the patient. This additional information could be updated continuously and displayed in real-time as the image analysis module and/or machine learning device detects potential changes the user could make.

Another implementation of guidance system disclosed herein is to utilize the movement instruction method and display to provide guidance to multiple anatomical views at once. The dial-like graphical display could be replicated multiple times on the display, one each for a particular view. The algorithm can display the movement instructions for the multiple views simultaneously. This would be impractical using current methods. For example, a user might be scanning a parasternal short axis view of the heart at the mitral valve level. Tilting the beam up could produce an image of the aortic valve, tilting the beam down could produce an image of the left ventricle at the papillary muscle level. Each option could be displayed without causing confusion to the user. This embodiment could be implemented by replicating the movement instruction graphic for each view, or alternatively, it could be implemented by placing a text or icon marker for a view at a position on a single movement instruction graphic. In some cases, one or more of the anatomical views are user selected via the user interface before or during the ultrasound examination. This allows a user to determine the anatomical views for which probe movement or guidance instructions will be provided.

Figure 7:
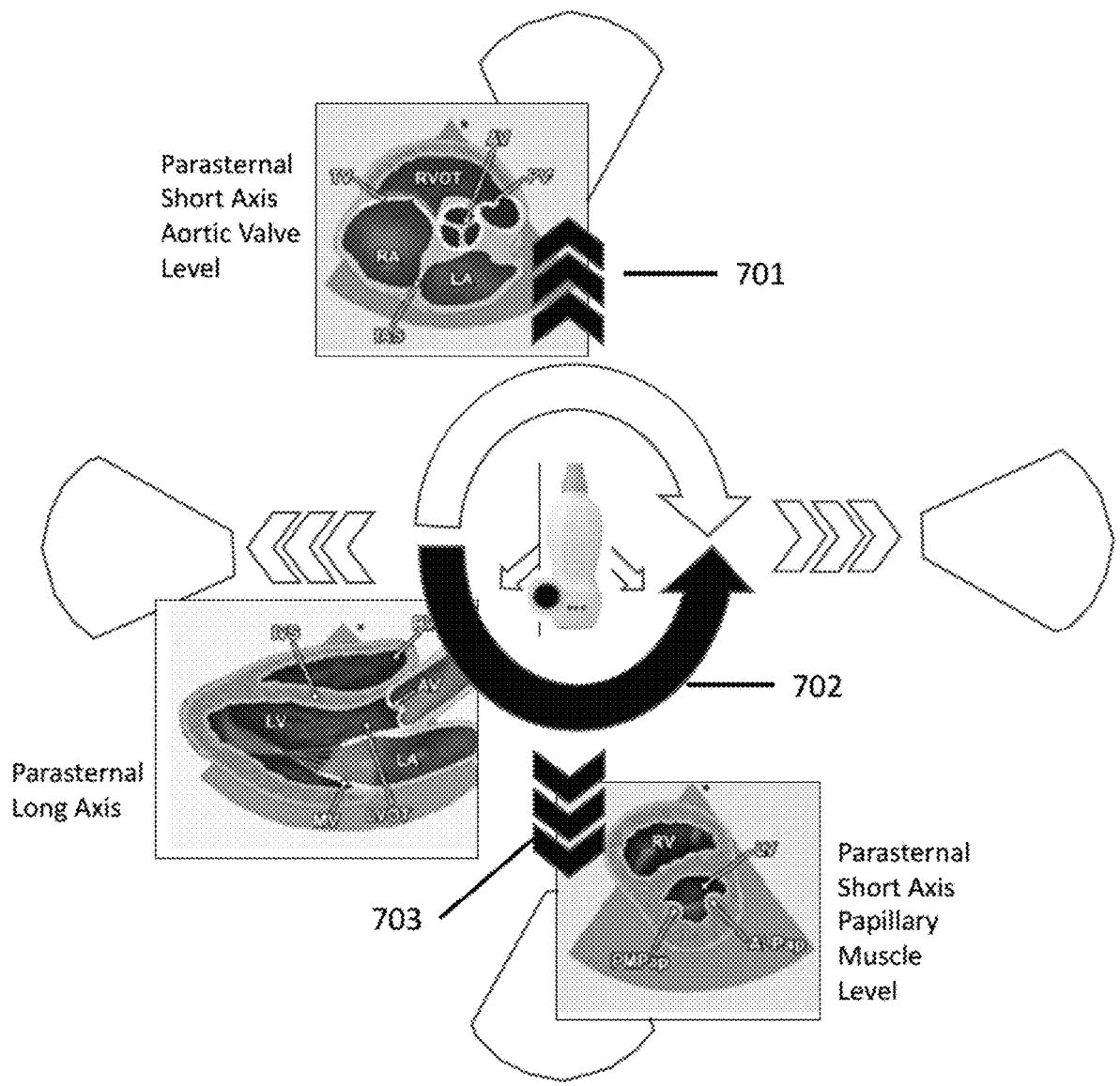
FIG. 7 shows visual indicators for probe movement instructions that provide guidance towards multiple views with an anatomical schematic shown next to the movement type to show which anatomical view would be obtained by that movement.

FIG. 7 provides a non-limiting, illustrative example of the navigational guidance movement instructions for multiple views. As shown, multiple movements to multiple views are provided simultaneously. Both the movement graphic filled in black and the associated target anatomical view next to the movement graphic are shown for three different views. From the current position, slide up 701 will produce a parasternal short axis at the aortic valve level, rotate counterclockwise 702 will produce a parasternal long axis view (papillary muscle level), and slide down 703 will produce the parasternal short axis. Alternatively, this graphical display could be implemented as a separate movement set of icons or visual indicators produced for each view instead of the multiple views sharing the same set of movement icons or visual indicators.

Figure 8:
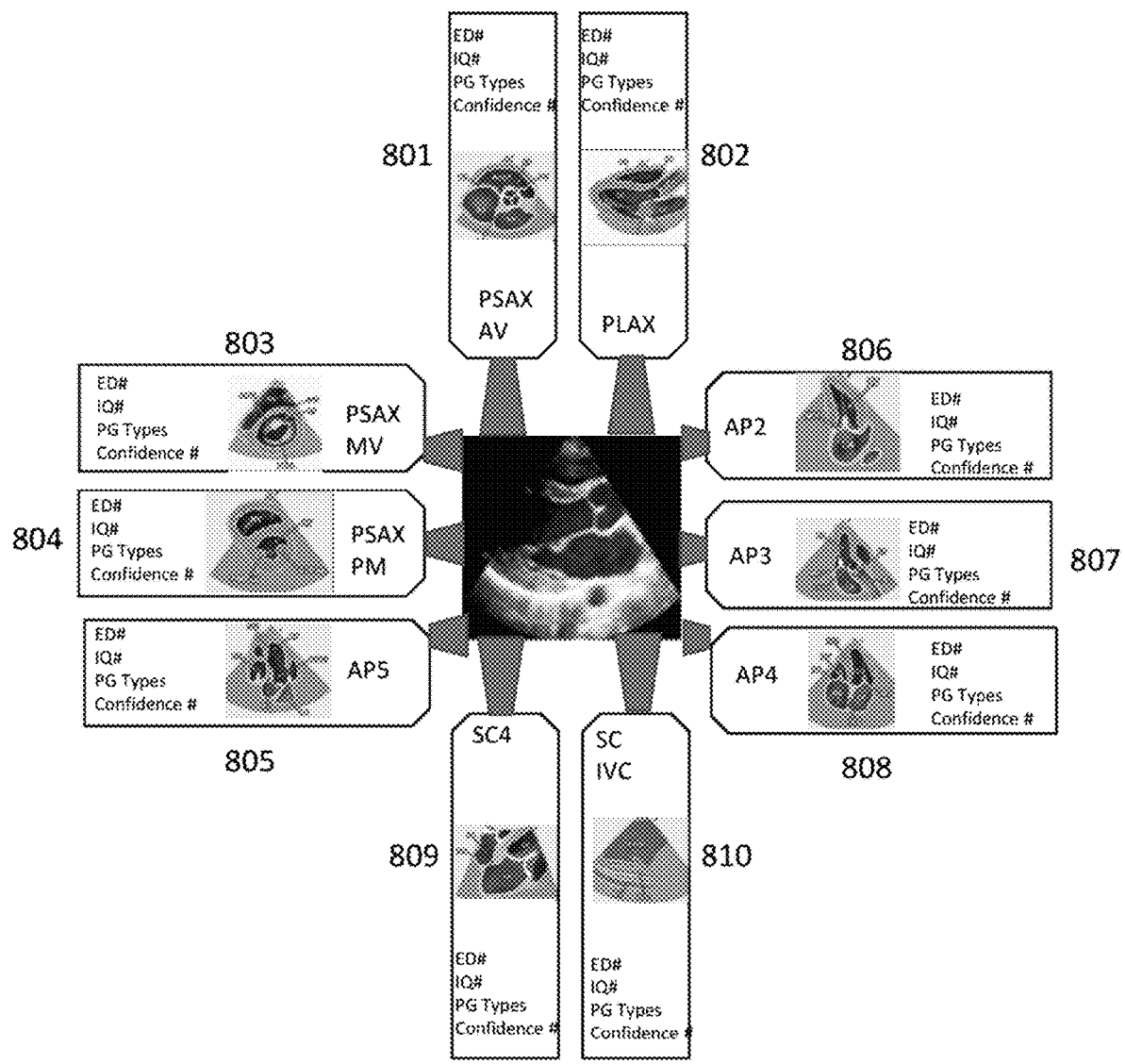
FIG. 8 shows multiple target views corresponding to anatomical views for an echocardiograph.

FIG. 8 shows a non-limiting, illustrative example of the navigational guidance movement instructions for multiple views and the corresponding data that may be generated for each view. The graphical display shows the following anatomical target views: PLAX (parasternal long axis) 802, PSAX AV (parasternal short axis aortic valve level) 801, PSAX MV (parasternal short axis mitral valve level) 803, PSAX PM (parasternal short axis papillary muscle level) 804, AP5 (apical five chamber) 805, SC4 (subcostal four chamber) 809, SC IVC (subcostal inferior vena cava) 810, AP4 (apical four chamber) 808, AP3 (apical three chamber) 807, and AP2 (apical two chamber) 806. As shown in the multiple anatomical views in FIG. 8, any given view can include one or more of the following data parameters: echo distance (ED) corresponding to the distance from the current probe position to the optimal position, image quality (IQ) corresponding to the clinical image quality of the image derived from echo distance, prescriptive guidance types (PG types) corresponding to the different types of probe movements identified and qualified, and confidence that a particular probe movement type is correct (confidence).

Nonlimiting examples of suitable methods for determining confidence comprise identification of one or more specific image frames which have a lower error rate for generating one probe movement type than another. The probe movement associated with the lower error rate for the specific image can then be given a higher confidence level compared to one or more probe movements associated with a higher error rate.

Confidence can be based on an echo distance basis of one or more particular probe movements. The echo distance basis can comprise identification of a confidence expectation based on a particular echo distance parameter, such as the magnitude of a movement needed to reach a particular pose with a view quality meeting a quality threshold, a movement vector that is shorter or easier for a user to make than another echo distance/probe movement combination, or a metric proven during algorithm training to more often result in acceptable image quality.

An echo distance parameter can have a threshold point that determines whether an image has a diagnostic quality or a non-diagnostic quality. The threshold point can be set based on a selected, particular, anatomical target, pathology, clinical question or view. The confidence value for a particular probe movement with a shorter echo distance or expected to be over a given diagnostic threshold can be higher than for one or more probe movements with longer echo distances or expected to result in an images below the threshold quality. The threshold values can be adjusted for different anatomical targets, ultrasound scanning modes, views, clinical questions, image quality goals, or other parameters, and probe movements that exceed these thresholds more than others can be given a higher confidence level.

Confidence can be determined by mapping, or transformation of the echo distance to an image quality score. This transformation can be implemented so that the IQ scores are optimized or customized for a particular view, pathology, patient condition, clinical question, or therapeutic plan. The transformation can be adapted to accomplish one or more of these optimization goals. IQ scores can be adapted through transformation parameters to give one or more probe movements a higher confidence value than alternative probe movements.

For example, a user could be scanning a view that includes a target anatomical feature such as an aortic valve, or following a protocol that includes assessing the target anatomical feature. An acquired image can produce an echo distance that comprises one or more IQ scores for the target anatomical feature (e.g. the aortic valve), and can further comprise one or more additional IQ scores for alternate target anatomical features (e.g. for the mitral valve if the primary target anatomical feature was the aortic valve). Anatomical features can be classified as primary targets and secondary targets or may be ranked according to priority by assigning each target or groups of targets one of a plurality of unique target priority identifiers. Ranked targets can be assigned different threshold values based upon their assigned rank. For example, when the primary target is the aortic valve, the echo distance to IQ score mapping could have a different threshold to trigger a probe movement for the aortic valve instead of a secondary or lower ranked target such as the mitral valve, and the movement towards the primary target could be given a higher confidence value.

Some approaches use thresholding combined with a form of time averaging and smoothing to give the user feedback that they can absorb without distraction of confusing information. However, disclosed herein are platforms, systems, and methods that address the need for a smooth user experience while providing instantaneous and multiparameter instruction by using signal processing techniques such an exponential moving average and/or a Kalman filter. This can maintain the instantaneous feedback to the user with a very gradual blending of the guidance features without requiring cutoff thresholds to be used.

This innovative approach can utilize novel uses of audio to provide guidance. The graphic display method described herein addresses the problem of getting instantaneous guidance feedback for multiple movements in a way that does not confuse the user with too many stimuli. As disclosed herein, in certain embodiments, audio methods augment or substitute for the visual method. The use of audio guidance may be advantageous because the brain may process diverse audio stimuli that are provided without temporal integration better than it can process such inputs visually.

Audio feedback can be provided to the user in various forms. Examples include simple verbal messages, such as producing an instruction to "Rotate Clockwise" through a speaker. Other examples include providing an audible beep to a user to indicate that a successful image has been captured. Non-verbal audible feedback may be used, for example, a speaker for producing various tones or sounds associated with a probe guidance instruction or image improvement step. The feedback signal could have an audible tone that increases or decreases frequency as the probe is moved from one position to another, varying with whether the direction is correct or incorrect for getting a good image. Such approaches may also rely on weighting of potential movement instructions, some form of temporal averaging or smoothing, and of selection of one or very few of a number of potential legitimate probe movements. These techniques may be used to avoid distracting and confusing the user with an overwhelming amount of verbal or tonal signals.

In some aspects, the platforms, systems, and methods disclosed herein provide for the user of an audio headset, which allows much more sophisticated audio signals to be used and implemented. In some cases, the use of an audio headset enables the left and right channels to be used to provide movement instructions relative to the left and right of the patient. For example, "Slide medial" instructions for scanning the heart, which anatomically means slide leftwards towards the middle of the probe from the left side of the body where the heart is being scanned, may be played as audio in the left channel only so only the left ear hears the instruction.

In some cases, verbal instructions and/or non-verbal instructions or sounds are used. If the instructions are continuous and of multiple types, verbal sound will be difficult for the user to comprehend. Alternatives to verbal sounds could be skeuomorphic, which uses sounds that are associated with real-world objects. For example, the playing of a slide whistle sound in the right ear could corresponding to instructions to slide right. The playing of a slide whistle sound in both ears increasing in frequency could correspond to instructions to slide up. In this approach, multiple instructions with different sound types could coexist and be provided simultaneously. Exponential moving average and/or Kalman filters, as mentioned above in relation to the visual feedback, could be used to smooth the output. "Sonic metaphors" where artificial tones or sounds that are not directly associated with existing real world sounds, but which have an intuitive ability to convey a direction, could be used instead of skeuomorphic sounds.

Figure 9:
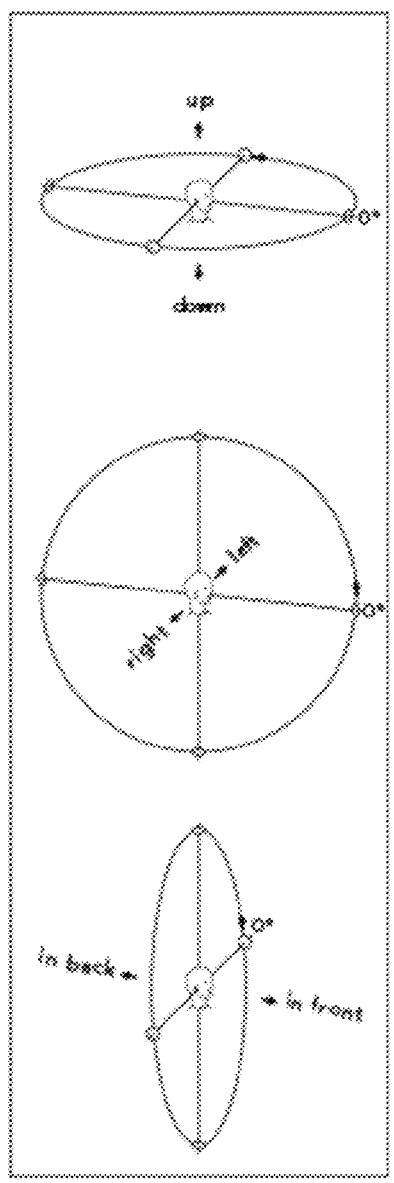
FIG. 9 shows a diagram illustrating the directions for providing three-dimensional spatial audio.
Figure 10:
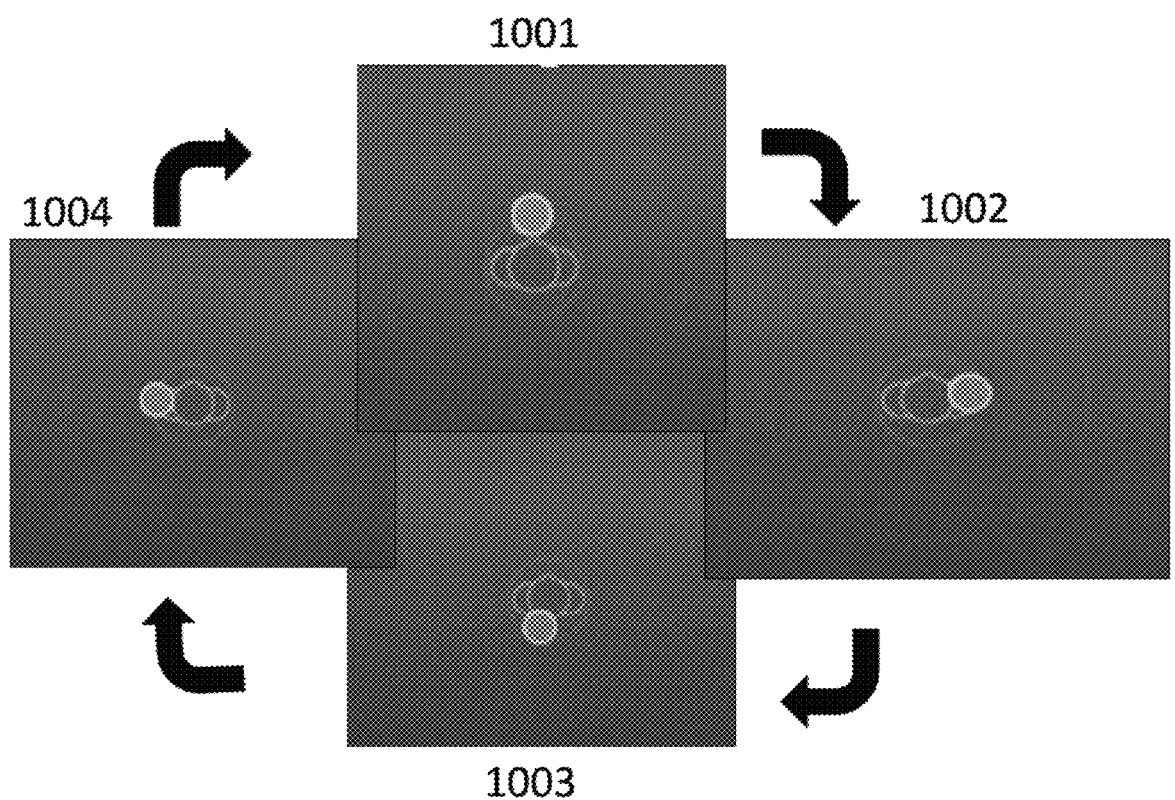
FIG. 10 shows a diagram illustrating how 3D spatial audio can be phased to communicate clockwise direction for use as a probe navigation or movement instruction.

In some cases, the audio headset uses 3D sound techniques. 3D audio or immersive sound is used in movies, video games, navigation for the blind, and other applications. The 3D audio mimics the way a person hears by providing three dimensional localization of sound. 3D audio played through headsets can present the hearer with a sense that a sound is directional as well as conveying a sense of distance. FIG. 9 provides an illustration of the directionality that can be provided using 3D audio, in which the sound may be perceived as coming from above, below, front, back, left right, near, far, etc. As disclosed herein, 3D audio can be used to convey directional movement. 3D audio instructions can, for example, play a sliding sound the user perceives as up or down, which exceeds what simple left-right speakers can do. For example, 3D audio instructions can make a sound appear to be moving in a circular manner, such as a clockwise direction, starting on the right, then above, then left, then below. FIG. 10 provides an illustration of the clockwise directionality of a sound (from a top down perspective with respect to the user) in which the audio is presented in front of the user 1001 and moves clockwise to the right of the user 1002, behind the user 1003, to the left of the user 1004, and repeats this circular movement. This method can be used to provide rotational direction. This method also allows multiple instructional sounds to be used simultaneously.

The audio techniques for providing instruction or navigational guidance disclosed herein can be combined with haptic feedback. In some cases, the haptic feedback is delivered through the headset. Current haptic feedback methods focus on providing the feedback through the handheld probe, with the idea that various vibrations could tell the user how to move the probe. However, the platforms, systems, and methods disclosed herein can utilize haptic feedback alone or in combination with the visual feedback and/or audio feedback.

Accordingly, disclosed herein are platforms, systems, and methods that provide fast and reliable ultrasound guidance instructions without relying on thresholding, single instruction feedback, and timing filters.

Machine Learning Algorithms

Disclosed herein are platforms, systems, and methods that provide ultrasound guidance instructions using machine learning algorithm(s). In particular, in some embodiments, the machine learning algorithms include deep learning neural networks configured for evaluating ultrasound images. The algorithms can include one or more of a positioning algorithm ("EchoGPS"), a scoring algorithm ("EchoScore"), and a probe guidance algorithm ("Prescriptive Guidance"). The positioning algorithm can include one or more neural networks that estimate probe positioning relative to an ideal anatomical view or perspective and/or a distance or deviation of a current probe position from an ideal probe position.

The development of each machine learning algorithm spans three phases: (1) dataset creation and curation, (2) algorithm training, and (3) adapting design elements necessary for product performance and usability. The dataset used for training the algorithm can be generated by obtaining ultrasound images that are then curated and labeled by expert radiologists, for example, according to positioning, score, and other metrics. Each algorithm then undergoes training using the training dataset, which can include one or more different target organs and/or one or more different views of a given target organ. The training dataset for the positioning algorithm may be labeled according to a known probe pose deviation from the optimal probe pose. A non-limiting description of the training and application of a positioning algorithm or estimator can be found in U.S. patent application Ser. No. 15/831,375, the entirety of which is hereby incorporated by reference. Another non-limiting description of a positioning algorithm and a probe guidance algorithm can be found in U.S. patent application Ser. No. 16/264,310, the entirety of which is hereby incorporated by reference. The design elements can include a user interface comprising an omnidirectional guidance feature.

Examples of machine learning algorithms can include a support vector machine (SVM), a naïve Bayes classification, a random forest, a neural network, deep learning, or other supervised learning algorithm or unsupervised learning algorithm for classification and regression. The machine learning algorithms can be trained using one or more training datasets.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10% unless otherwise specified.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, the terms "image-derived EKG", "image derived EKG", "image-derived ECG", and "image derived ECG", are used interchangeably to refer to a time series sequence of information obtained at least partially from the contents of an ultrasound image, which can be used to inform clinical decisions in a manner similar to a conventional, electrically acquired EKG. An image-derived EKG may have an electrical component (e.g. when the ultrasound image is used to enhance the clinical usability of a low-resolution electrically acquired EKG), or can also be based on an ultrasound image alone (e.g. when a trained machine learning algorithm is used to extract this information from the images without the use of electrical leads on the patient or subject). Optionally, the image-derived EKG can be implemented to produce a graphic waveform display, similar to a conventional electrically acquired EKG.

As used herein, "comparable quality" in the context of comparing two EKGs, two image-derived EKGs, or an image-derived EKG and a conventional (electrical) EKG, generally refers to the scenario where a clinician can reasonably rely on the information provided by the compared EKGs to make or inform clinical diagnoses with equal confidence. Two EKGs can be considered of comparable quality if they are determined to be clinically equivalent or equivalent in clinical interpretation (e.g., identification of an EKG status or abnormality by a trained clinician or group of clinicians) at an equivalence rate of at least 80%, unless otherwise specified. In some cases, comparable quality is indicative of an equivalence rate of at least 85%, 90%, 95%, 96%, 97%, 98%, or 99%.

As used herein, "clinical quality" refers to an image quality sufficient for a skilled clinician to make a reliable diagnosis. E.g. it is the minimum quality of the image and view of a particular probed feature that a reasonable clinician would use to make or inform a clinical diagnosis concerning that feature. A sufficient raw-image quality (e.g. pixel resolution, contrast, and the like) to reliably view the feature is needed, for clinical quality, but is not in of itself enough to provide a clinical quality image. For example, in ultrasound imaging of a heart valve, the raw image quality must be of a sufficient quality to see the heart valve, but the operator must also place the ultrasound imaging probe in the proper location and orientation on the patient to ensure the correct features of the heart valve are in fact visible and clear. An image can be considered to be clinical quality if over 80% of a group of trained clinicians correctly identifies the target feature, unless otherwise specified. The target feature can be a structure such as a heart valve or an EKG status or abnormality, In some cases, clinical quality is indicative of the evaluation of an image by a statistically significant group of trained clinicians that identifies the target feature with an accuracy of at least 80%, 85%, 90%, or 95%.

Computing System

Figure 11:
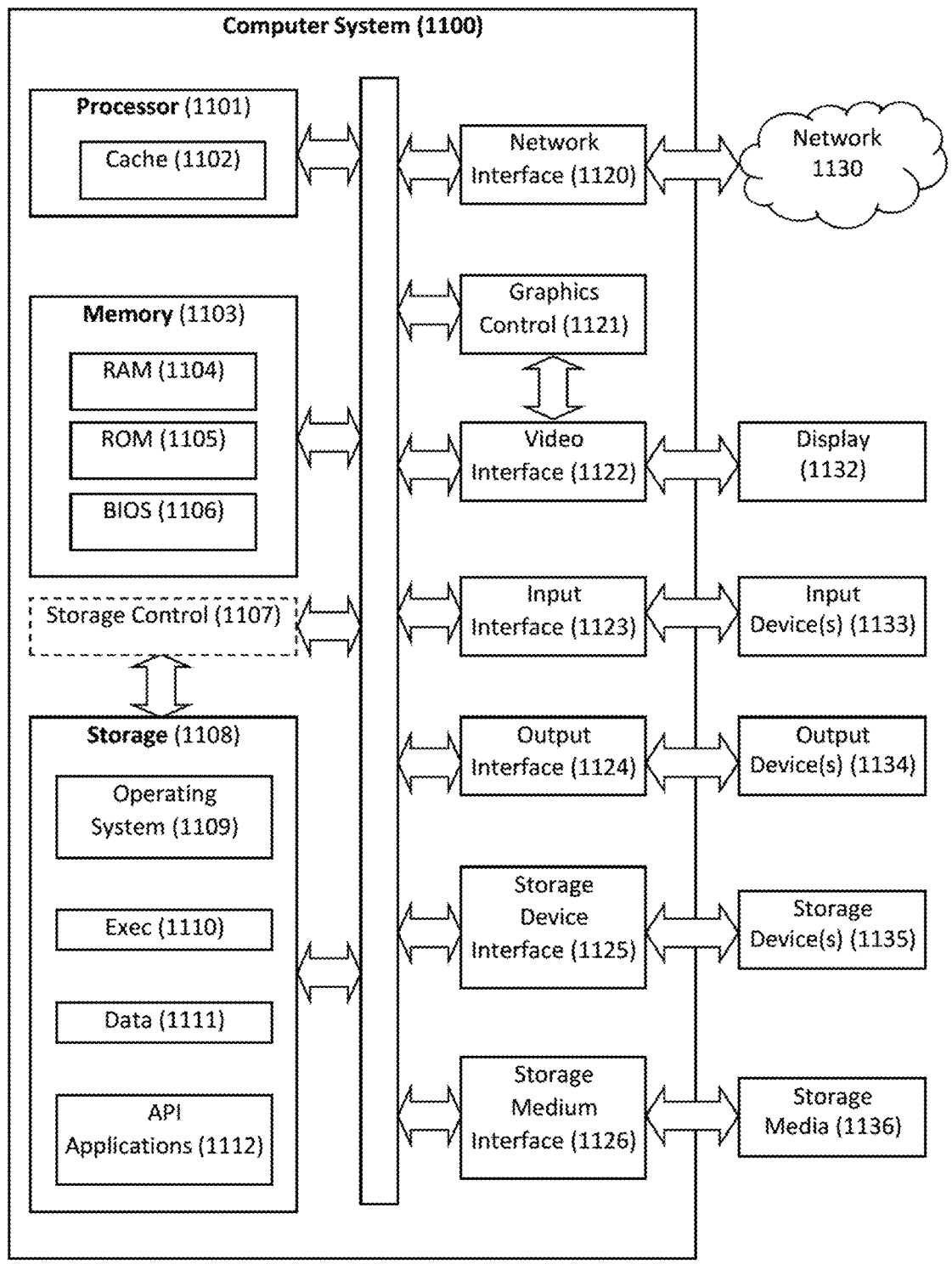
FIG. 11 shows a non-limiting example of a computing device; in this case, a device with one or more processors, memory, storage, and a network interface.

Referring to FIG. 11, a block diagram is shown depicting an exemplary machine that includes a computer system 1100 (e.g., a processing or computing system) within which a set of instructions can execute for causing a device to perform or execute any one or more of the aspects and/or methodologies for static code scheduling of the present disclosure. The components in FIG. 11 are examples only and do not limit the scope of use or functionality of any hardware, software, embedded logic component, or a combination of two or more such components implementing particular embodiments.

Computer system 1100 may include one or more processors 1101, a memory 1103, and a storage 111108 that communicate with each other, and with other components, via a bus 1140. The bus 1140 may also link a display 1132, one or more input devices 1133 (which may, for example, include a keypad, a keyboard, a mouse, a stylus, etc.), one or more output devices 1134, one or more storage devices 1135, and various tangible storage media 1136. All of these elements may interface directly or via one or more interfaces or adaptors to the bus 1140. For instance, the various tangible storage media 1136 can interface with the bus 1140 via storage medium interface 1126. Computer system 1100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 1100 includes one or more processor(s) 1101 (e.g., central processing units (CPUs) or general purpose graphics processing units (GPGPUs)) that carry out functions. Processor(s) 1101 optionally contains a cache memory unit 1102 for temporary local storage of instructions, data, or computer addresses. Processor(s) 1101 are configured to assist in execution of computer readable instructions. Computer system 1100 may provide functionality for the components depicted in FIG. 11 as a result of the processor(s) 1101 executing non-transitory, processor-executable instructions embodied in one or more tangible computer-readable storage media, such as memory 1103, storage 1108, storage devices 1135, and/or storage medium 1136. The computer-readable media may store software that implements particular embodiments, and processor(s) 1101 may execute the software. Memory 1103 may read the software from one or more other computer-readable media (such as mass storage device(s) 1135, 1136) or from one or more other sources through a suitable interface, such as network interface 1120. The software may cause processor(s) 1101 to carry out one or more processes or one or more steps of one or more processes described or illustrated herein. Carrying out such processes or steps may include defining data structures stored in memory 1103 and modifying the data structures as directed by the software.

The memory 1103 may include various components (e.g., machine readable media) including, but not limited to, a random access memory component (e.g., RAM 1104) (e.g., static RAM (SRAM), dynamic RAM (DRAM), ferroelectric random access memory (FRAM), phase-change random access memory (PRAM), etc.), a read-only memory component (e.g., ROM 1105), and any combinations thereof. ROM 1105 may act to communicate data and instructions unidirectionally to processor(s) 1101, and RAM 1104 may act to communicate data and instructions bidirectionally with processor(s) 1101. ROM 1105 and RAM 1104 may include any suitable tangible computer-readable media described below. In one example, a basic input/output system 1106 (BIOS), including basic routines that help to transfer information between elements within computer system 1100, such as during start-up, may be stored in the memory 1103.

Fixed storage 1108 is connected bidirectionally to processor(s) 1101, optionally through storage control unit 1107. Fixed storage 1108 provides additional data storage capacity and may also include any suitable tangible computer-readable media described herein. Storage 1108 may be used to store operating system 1109, executable(s) 1110, data 1111, applications 1112 (application programs), and the like. Storage 1108 can also include an optical disk drive, a solid-state memory device (e.g., flash-based systems), or a combination of any of the above. Information in storage 1108 may, in appropriate cases, be incorporated as virtual memory in memory 1103.

In one example, storage device(s) 1135 may be removably interfaced with computer system 1100 (e.g., via an external port connector (not shown)) via a storage device interface 1125. Particularly, storage device(s) 1135 and an associated machine-readable medium may provide non-volatile and/or volatile storage of machine-readable instructions, data structures, program modules, and/or other data for the computer system 1100. In one example, software may reside, completely or partially, within a machine-readable medium on storage device(s) 1135. In another example, software may reside, completely or partially, within processor(s) 1101.

Bus 1140 connects a wide variety of subsystems. Herein, reference to a bus may encompass one or more digital signal lines serving a common function, where appropriate. Bus 1140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1100 may also include an input device 1133. In one example, a user of computer system 1100 may enter commands and/or other information into computer system 1100 via input device(s) 1133. Examples of an input device(s) 1133 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 1133 may be interfaced to bus 1140 via any of a variety of input interfaces 1123 (e.g., input interface 1123) including, but not limited to, serial, parallel, game port, USB, FIREWIRE, THUNDERBOLT, or any combination of the above.

In particular embodiments, when computer system 1100 is connected to network 1130, computer system 1100 may communicate with other devices, specifically mobile devices and enterprise systems, distributed computing systems, cloud storage systems, cloud computing systems, and the like, connected to network 1130. Communications to and from computer system 1100 may be sent through network interface 1120. For example, network interface 1120 may receive incoming communications (such as requests or responses from other devices) in the form of one or more packets (such as Internet Protocol (IP) packets) from network 1130, and computer system 1100 may store the incoming communications in memory 1103 for processing. Computer system 1100 may similarly store outgoing communications (such as requests or responses to other devices) in the form of one or more packets in memory 1103 and communicated to network 1130 from network interface 1120. Processor(s) 1101 may access these communication packets stored in memory 1103 for processing.

Examples of the network interface 1120 include, but are not limited to, a network interface card, a modem, and any combination thereof. Examples of a network 1130 or network segment 1130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 1130, may employ a wired and/or a wireless mode of communication. In general, any network topology may be used.

Information and data can be displayed through a display 1132. Examples of a display 1132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 1132 can interface to the processor (s) 1101, memory 1103, and fixed storage 1108, as well as other devices, such as input device(s) 1133, via the bus 1140. The display 1132 is linked to the bus 1140 via a video interface 1122, and transport of data between the display 1132 and the bus 1140 can be controlled via the graphics control 1121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 1132, computer system 1100 may include one or more other peripheral output devices 1134 including, but not limited to, an audio speaker, a printer, a storage device, and any combinations thereof. Such peripheral output devices may be connected to the bus 1140 via an output interface 1124. Examples of an output interface 1124 include, but are not limited to, a serial port, a parallel connection, a USB port, a FIREWIRE port, a THUNDER-BOLT port, and any combinations thereof.

In addition or as an alternative, computer system 1100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSDO, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 12:
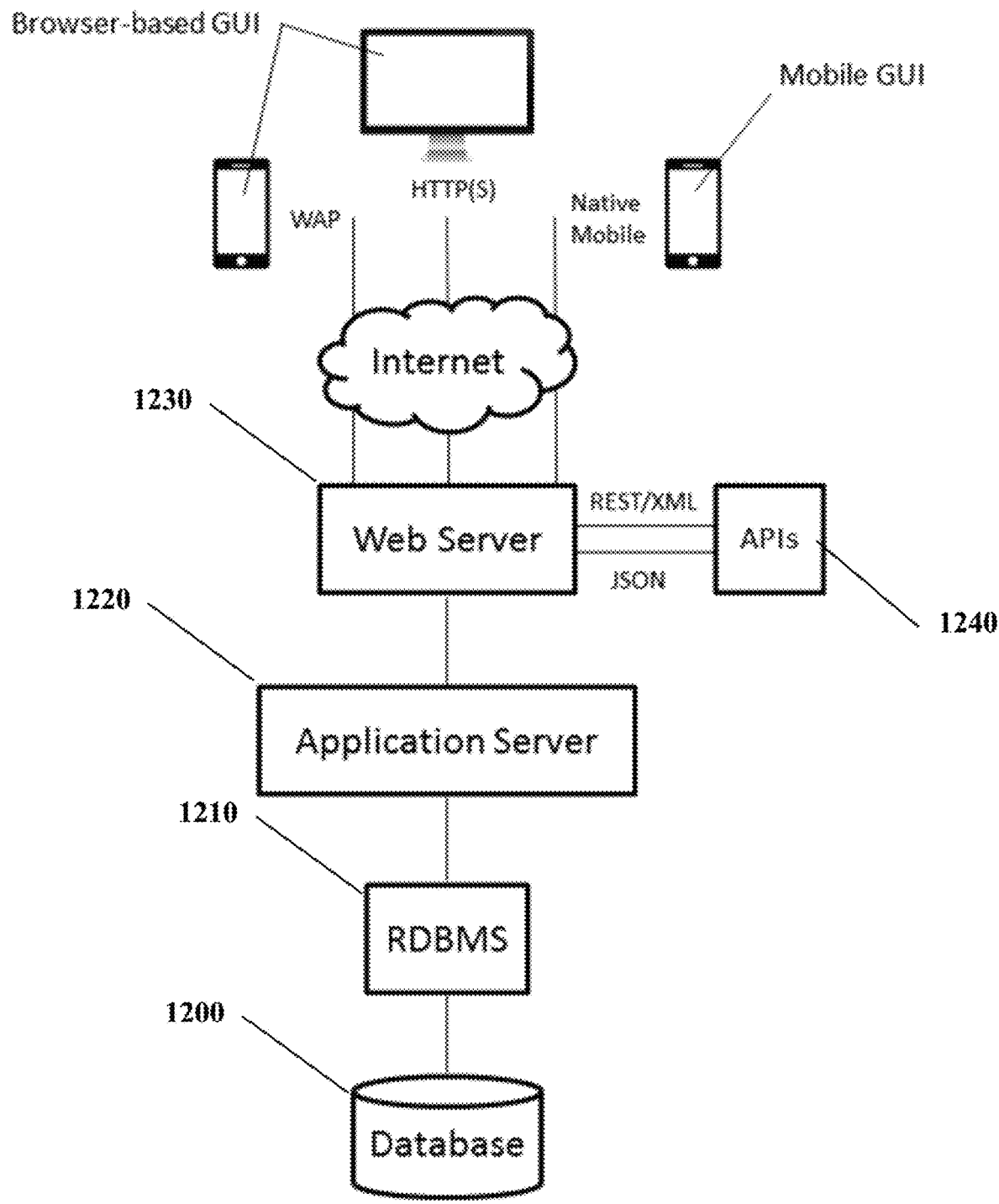
FIG. 12 shows a non-limiting example of a web/mobile application provision system; in this case, a system providing browser-based and/or native mobile user interfaces.

Referring to FIG. 12, in a particular embodiment, an application provision system comprises one or more databases 1200 accessed by a relational database management system (RDBMS) 1210. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1220 (such as Java servers, .NET servers, PHP servers, and the like) and one or more web servers 1230 (such as Apache, IIS, GWS and the like). The web server(s) optionally expose one or more web services via app application programming interfaces (APIs) 1240. Via a network, such as the Internet, the system provides browser-based and/or mobile native user interfaces.

Figure 13:
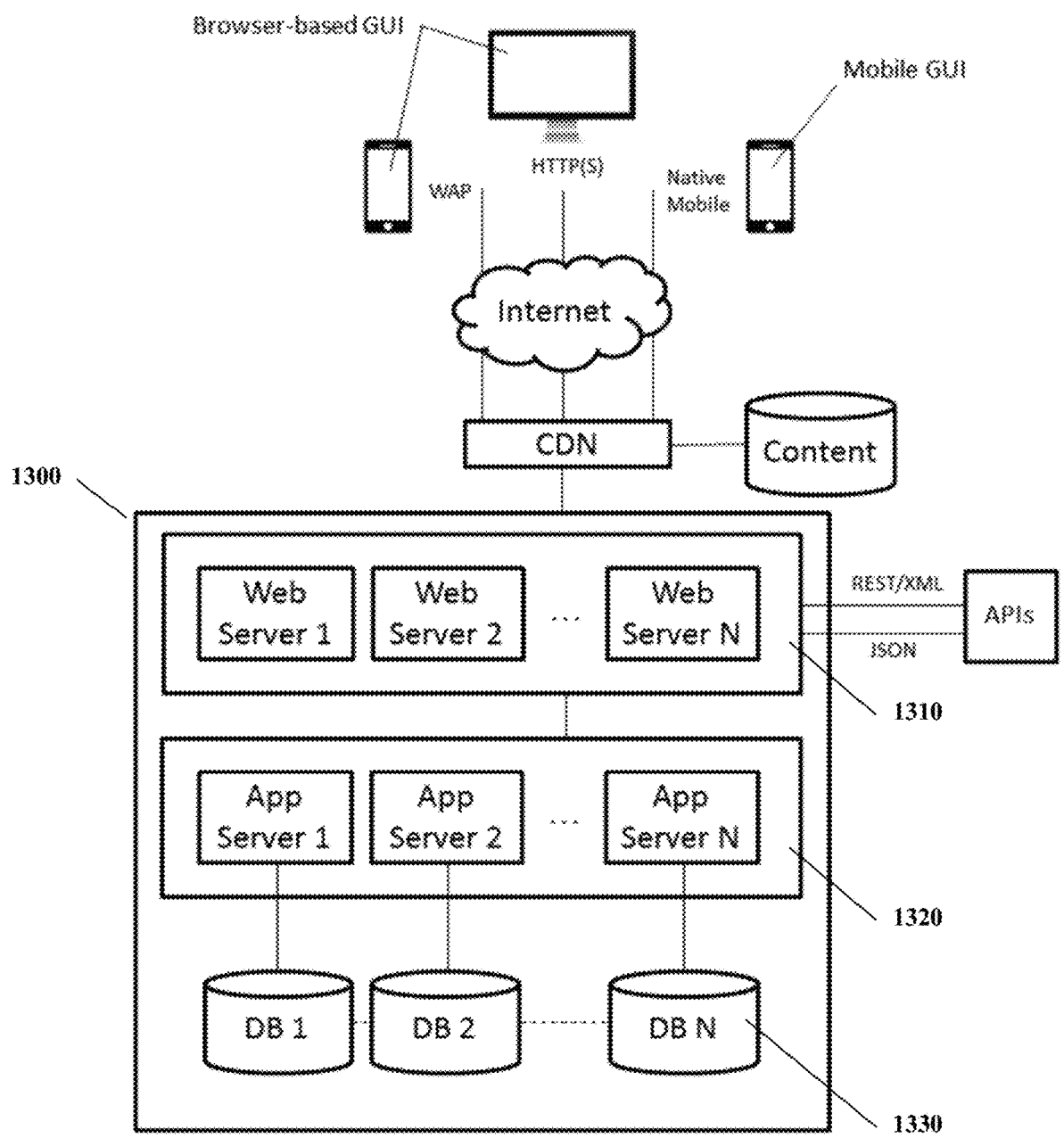
FIG. 13 shows a non-limiting example of an application provision system alternatively as a distributed, cloud-based architecture.

Referring to FIG. 13, in a particular embodiment, an application provision system alternatively has a distributed, cloud-based architecture 1300 and comprises elastically load balanced, auto-scaling web server resources 1310 and application server resources 1320 as well synchronously replicated databases 1330.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of DEL information and associated experimental data collected for one or more conditions. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

Image-Derived EKG Acquisition

Trained machine learning algorithms and models such as neural networks described herein can be used for detecting heart rhythm characteristics in ultrasound images. Extraction of this type of information is particularly informative in heart imaging, but heart rhythm information can also be applied to the imaging of other organs, particularly blood vessels and when screening for other conditions in the circulatory system (e.g. pulmonary embolisms, aneurysms, and similar circulatory obstructions).

Integration of Heart Rhythm Methods with Ultrasound Acquisition and Image Analysis Methods Integrating the detection and analysis of heart rhythm characteristics with scanning prescriptive guidance methods, image quality scoring, autocapture of quality images, save best clip memory storage of quality images, and clip selector functions that select clips with certain characteristics from images previously acquired as described herein can provide substantial advantages in diagnosing latent conditions (including life threatening conditions) that would otherwise go undetected, even by an unskilled ultrasound operator.

For example, a quality indicator can be provided in a user interface of the ultrasound system and methods described herein that represents the rhythm quality of the image based on heart rhythm factors. Rhythm quality in this instance is not primarily or only related to the image itself, but instead is about the heart rhythm characteristic of the patient as the algorithm detects from the images. Rhythm quality can be used in combination with other quality metrics. For example, a user interface may provide more than one quality meter or a combined indicator of rhythm quality and suitability for diagnosis (which measures whether appropriate anatomical targets are clearly shown in the image with minimal noise or clutter).

Detection, Analysis, and Utilization of Heart Rhythm Abnormality Characteristics Obtained from Ultrasound Images Using an "Index Beat"

Machine learning models described herein can detect from a series of ultrasound images a contemporaneous heart phase (used interchangeably with rhythm position herein). Using the ultrasound device frame rate heart rhythm characteristics especially heart rhythm time interval (R wave to R wave) over multiple heart beats can be automatically measured. One full time interval of a heart rhythm can also be referred to as an "index beat". Measured characteristics of the heart cycle (such as an index beat frequency) can be used to provide a heart rhythm quality indicator that guides acquisition and/or image saving.

Another example of this is a "Single Beat Rhythm Detection" method. This classifier determines if images correspond to normal sinus rhythm by applying a curve fit model of normal sinus rhythm to the curve generated by the classifier based on the images. This can optionally be used over multiple heart rhythms, but importantly can operate on just a single heart rhythm (e.g. a heart cycle).

These methods can be used for deriving heart rhythm interval time information (e.g. an index beat) and using that in the ultrasound scanning to indicate normal and/or abnormal conditions. Curve fit models can additionally be used to indicate normal and abnormal conditions.

A neural network can be specifically trained to detect heart rhythm abnormality due to specific abnormal conditions where the abnormal conditions have structural or functional manifestations in the image itself (e.g. septal flash).

EXAMPLES

Example 1: Algorithm Development and Neural Network

In a large database of echo studies, thousands of studies and image video clips include EKG trace and EKG timing information correlated to the video clips. In a number of instances there is a data tag in the video clip that associates a particular frame with the R wave point. This is based on the detection of an R wave signal by the EKG circuitry of the ultrasound device. In general, especially with a large number of studies this can be considered an accurate timing marker. When an ultrasound system does not detect a strong R wave signal, it will not save a clip with such a tag. This provides a ground truth source of the beginning of ventricular systole.

Thousands of clips with this tagging were used to train the algorithm. Clips include two-dimensional (tissue imaging) mode as well as Color Flow Doppler mode (which combines the display of tissue using two dimensional mode and blood flow mapping using Color Flow Doppler.) Clips from all of the 11 echocardiographic views were used. The two scanning modes, and the 11 individual views produced 22 individual neural network models These 22 neural networks were then integrated into a single model. This model provides the detection of the start of ventricular systole, and the heart rhythm interval.

This model can be updated to predict end systole using labeled clips that identify video frames associated with end systole. It can also be extended to detect a variety of cardiac rhythm changes or abnormalities by training with images labeled with these conditions.

An example implementation is described in detail below:

A metadata tag "R Wave Time Vector" gives access to the timestamps (in milliseconds) of each "R Wave" (from a correlated EKG signal) since the start of the clip.

Interpolation between each "R Wave" is then possible using any appropriate periodic function. For example, a combination of cosine and sine waves can be used.

Given both a vector of timestamps corresponding to "R Waves" (from "RWaveFrameVector") and a vector of timestamps corresponding to each recorded frame (from "FrameTimeVector"), labels can be produced for each frame in the clip (e.g., a tuple $(\cos[2\pi x], \sin[2\pi x])$ where x is $[t-r_<]/[r_>-r_<]$, t being the timestamp of a frame and $r_<$ and $r_>$ being the timestamps of the immediately preceding and immediately following R wave respectively).

Bootstrapping Method Using Metadata Harvesting

This example procedure assumes that in between "R Waves" the patient experiences a Normal Sinus Rhythm (NSR). Therefore, on a small set of patients experiencing heart rhythm abnormalities (e.g., Atrial Fibrillation), these interpolated labels will be wrong. However, these abnormalities are typically <3-4% of the whole population, and given the capabilities of Deep Neural Networks to generalize even in the presence of moderate label noise, these labels can provide a powerful supervisory signal for training purposes. Assuming normal sinus rhythm in the training provides a basis for abnormality detection later using additional neural network training.

Figure 17:
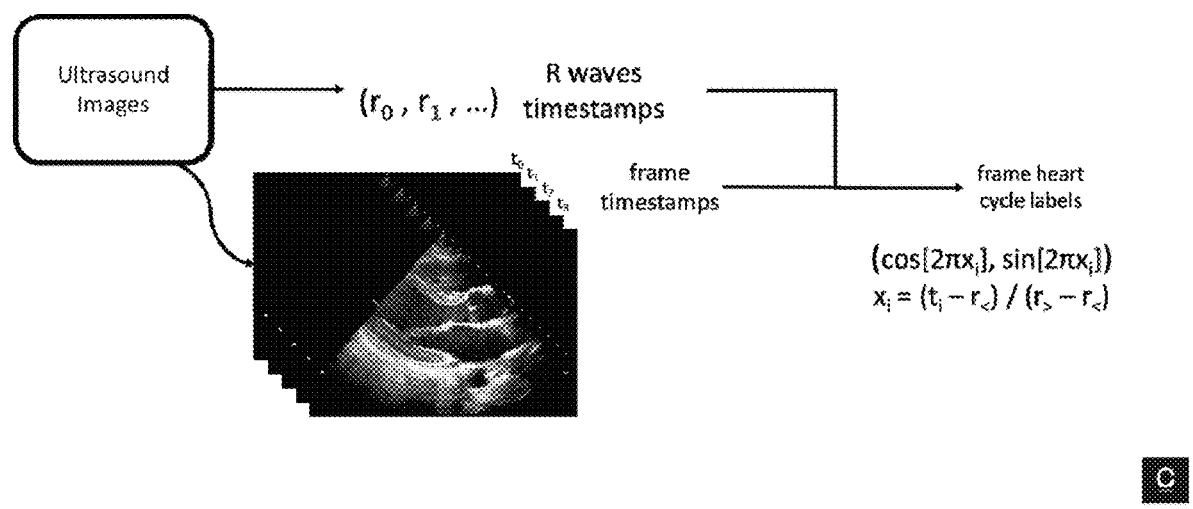
FIG. 17 illustrates an example bootstrapping method useful for training a machine learning model to produce image-derived EKG measurements from an ultrasound image.

An illustration of this Bootstrapping method workflow is shown in FIG. 17.

Only a small fraction of image databases had the metadata tag "RWaveTimeVector" available in the study metadata (since it is not a standardized procedure to collect an EKG at the same time as an ultrasound, and not all facilities/ultrasound imaging systems even offer this capability).

Consequently, a diverse dataset of training files over patient characteristics (age, BMI, sex) and viewpoints (combination of mode and view of the heart) was created.

Temporal convolutional models for each viewpoint (using a 1D convolutional neural network combining image embedding vectors across time) were trained. These models' predictions, especially their generalization capabilities on unseen ultrasound models were then introspected.

Upon satisfactory testing, these models were deployed to produce labels on a whole core training dataset called Echo ImageNet. That is, the model and labels it produces, derived from a relatively smaller dataset, were extrapolated to a significantly larger dataset. The new, larger dataset, "Echo ImageNet" includes heart rhythm labels, even though they were not provided in most of the original images. Echo ImageNet serves as a model development platform.

Example 2: Heart Rhythm Regression

Using Heart rhythm models, as described herein, labels for each frame of each file in the large training set were predicted.

Moreover, post-processing routines, leveraging the periodicity of heart rhythms, further improved the accuracy of R wave detection, leading to even more accurate new generation labels. Once these new improved labels became available, the next generation of large convolutional models could be trained in an iterative fashion.

Example 3: Example Implementation of the "Index Beat" Method

This classifier and user interface feature can determine, over a number of heart rhythms, that the individual heart rhythms in a sequence have either the same time duration, or a different time duration. This can be done by using number of frames as a way to measure time, as long as the frame rate is not changed or using a timer. Verifying that the frame rate is unchanged can be included in the operation, the algorithm could get that from the ultrasound imaging system. If the duration of some multiple number of frames is the same, a clip can be saved, and/or used for doing a measurement. In one example, the design can check that a threshold number of preceding heart rhythms (e.g. at least 2, 3, 4, 5, 10, 20, or 60) be the same time duration as the most recent heart rhythm. If that condition is met, the most recent one can be saved/and or used for a measurement. If there is variation, then the clips would be flagged as possibly representing arrythmia which can trigger an optional warning to the user. Auto saving and auto measurements can be designed to avoid use of suspect clips which do not exhibit a normal sinus rhythm. This is useful because measurement inaccuracies can result from the presence of arrythmias in analyzed clips. This particularly includes measurements related to left ventricular function such as stroke volume, ejection fraction, and cardiac output.

Figure 18:
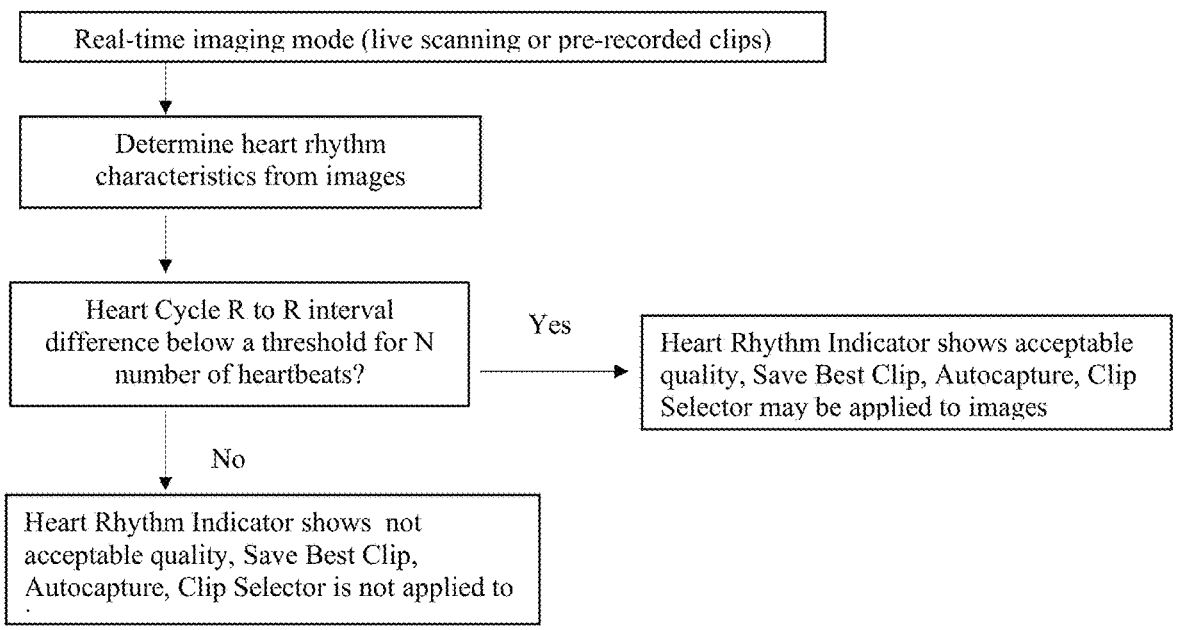
FIG. 18 illustrates an example workflow for real-time acquisition of ultrasound images with image-derived monitoring of heart rhythm.
Figure 19:
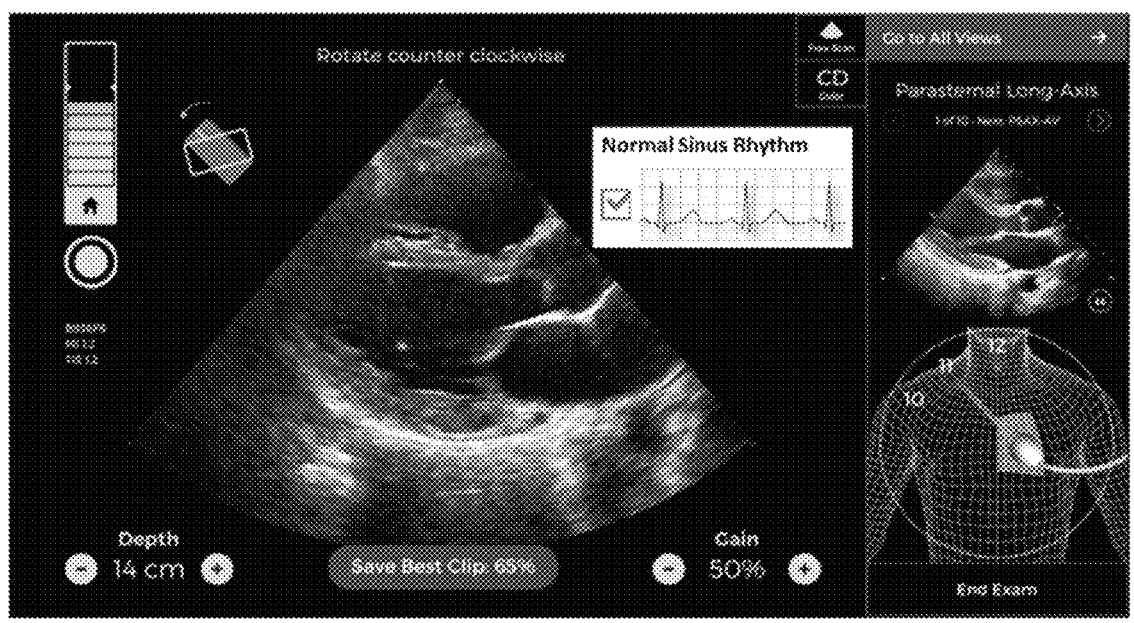
FIG. 19 illustrates an example user interface showing an image-derived EKG produced in real time during acquisition of a sequence of ultrasound images, together with an alert that the system has detected a normal sinus rhythm.
Figure 20:
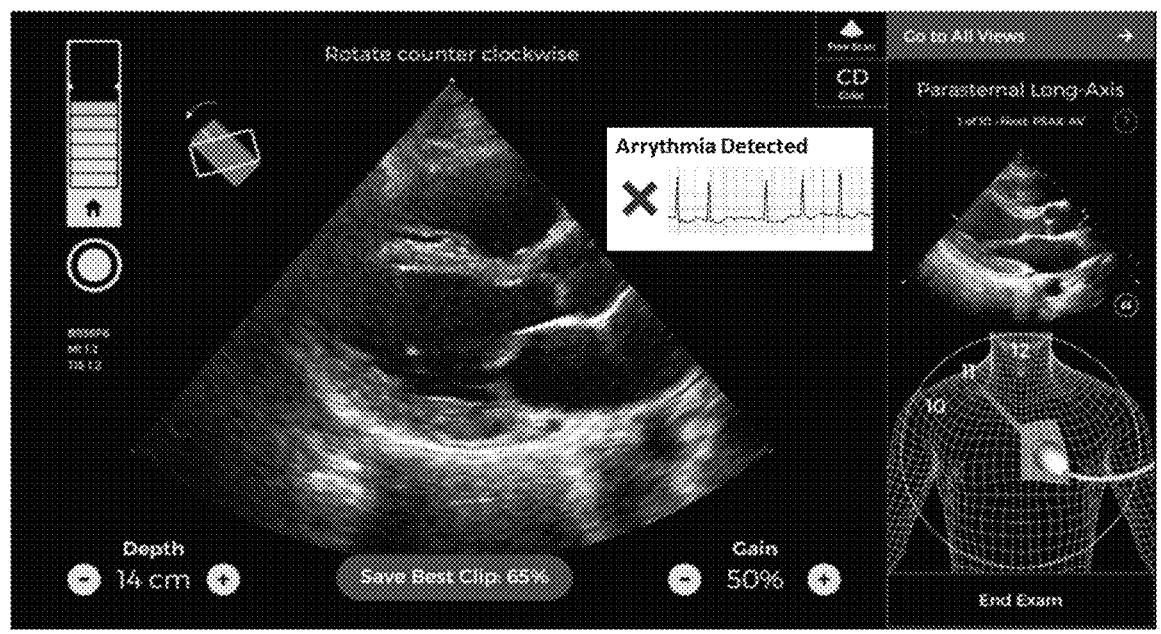
FIG. 20 illustrates an example user interface showing an image-derived EKG produced in real time during acquisition of a sequence of ultrasound images, together with an alert that the system has detected an arrythmia.

FIG. 18 shows an example workflow using real-time Index Beat analysis to improve the quality of: Guidance, Image Quality, Auto-capture, Save Best Clip, and/or Clip Selector features. Examples of a user interface providing alerts are shown in FIGS. 19-20. A normal sinus rhythm indicator and image-derived EKG is illustrated in FIG. 19, while an equivalent indicator depicting the detection of an arrythmia is detailed in FIG. 20.

The invention can be implemented in forms where it operated either during real-time scanning and acquisition or on already-acquired clips stored in a study.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

EMBODIMENTS

Embodiments

1. A method for ultrasound imaging, the method comprising:
   (a) acquiring a plurality of ultrasound images of at least a portion of an organ of a subject, the plurality of ultrasound images comprising images captured across at least a portion of one full heart rhythm;
   (b) determining based on one or more of the acquired plurality of ultrasound images, a heart rhythm characteristic corresponding to the one or more of the acquired plurality of images;
   (c) constructing, based on the heart rhythm characteristic determined in (b), an image-derived EKG.

2. The method of embodiment 1, wherein the step of acquiring the plurality of ultrasound images in (a) is performed in real-time, and further comprising:
   (e) alerting a user in real time that the image-derived EKG deviates from a reference EKG by more than a threshold value.

3. The method of any of the preceding embodiments, further comprising:
   determining that the image-derived EKG indicates an abnormal condition in the subject; and
   indicating to a user an identity of the abnormal condition.

4. The method of embodiment 3, wherein the abnormal condition is: ST Segment Elevated Myocardial Infarction, Septal Flash, and/or a left bundle-branch blockage.

5. The method of any of embodiments 2-4, wherein the reference EKG is a normal sinus rhythm.

6. The method of any of the preceding embodiments, further comprising computing a deviation of the image-derived EKG from a normal sinus rhythm.

7. The method of any of the preceding embodiments, further comprising providing a real time indicator of heart rhythm quality to the user during scanning.

8. The method of any of the preceding embodiments, wherein the plurality of ultrasound images are automatically saved in a memory of the ultrasound system upon determination that images representing at least one full heart rhythm have been acquired.

9. The method of any of the preceding embodiments, further comprising receiving an EKG signal from one or more EKG wire leads attached to the subject, wherein the step of constructing the image-derived EKG in (c) is further based on the EKG signal.

10. The method of embodiment 9, wherein the image-derived EKG is constructed using no more than 1, 2, 3, 4, 5, 6, 7, 8, 9, 10, 11, or 12 EKG wire leads attached to the subject.

11. The method of embodiment 10, wherein the image-derived EKG is constructed using no more than 1, 2, 3, 4, 5, 6, 7, 8, 9, or 10 electrodes attached to the subject.

12. The method of any of the preceding embodiments, wherein the image-derived EKG is constructed without the use of EKG wire leads attached to the subject.

13. The method of any of the preceding embodiments, wherein the image-derived EKG is of a comparable quality to a standard 12-lead EKG.

14. The method of any of the preceding embodiments further comprising, providing a heart rhythm quality indicator to the user during scanning, or on pre-recorded images, wherein the quality indicator is used to show that the patient is in sinus rhythm and/or that the multi-frame image clips may reliably be used for assessments that require regular heart rhythm.

15. The method of any of the preceding embodiments, wherein the plurality of ultrasound image clips are integrating this with acquisition features such as image autocapture, save best clip, and clip selector.

16. The method of any of the preceding embodiments, wherein constructing the image-derived EKG comprises using a neural network to analyze an image frame sequence of the plurality of acquired ultrasound images and assessing a time interval of one or more heart rhythm.

17. The method of any of the preceding embodiments, wherein the plurality of ultrasound images are automatically saved in a memory of the ultrasound system upon detection of at least one index beat.

18. The method of any of the preceding embodiments, wherein the plurality of ultrasound images are automatically saved in a memory of the ultrasound system upon determination that images representing an image clip having a clinically sufficient length and quality for a selected view of the target organ.

19. A method for a circuitless heart rhythm determination during cardiac ultrasound comprising:

submitting a cardiac ultrasound video clip of one or more image frames of a target heart muscle to a classifier trained with an annotated set of images each of a corresponding heart muscle captured at a specified phase of a heart rhythm with a ground truth indication of the specified phase of the heart rhythm drawn from a separately recorded cycle graph of an electrical signal measured over time for the corresponding heart muscle;

receiving in response to the submission, a classification of different portions of the submitted one or more image frames according to corresponding phases of the heart rhythm (e.g. a heart cycle); and, determining a contemporaneous one of the corresponding phases of the heart rhythm for the target heart muscle without sensing electrical signals by way of a closed-loop sensor circuit affixed proximately to the target heart muscle.

20. The method of embodiment 19, wherein the classification of the captured imagery is the classification of a portion of the one or more image frames corresponding to an R-wave portion of the cycle graph measured over the heart rhythm (e.g. a heart cycle).

21. The method of embodiment 19, wherein the classification of the captured imagery is the classification of a portion of the one or more image frames corresponding to an R-to-R interval of the cycle graph measured over multiple different heart rhythm (e.g. a heart cycle)s.

22. The method of embodiment 19, further comprising identifying portions of the one or more image frames corresponding to an R-wave and removing remaining other portions of the one or more image frames.

23. The method of embodiment 22, further comprising specifying a number of the different heart rhythm (e.g. a heart cycle)s, clipping the one or more image frames to include only portions of the one or more image frames corresponding to the R-to-R interval for the specified number of the different heart rhythm (e.g. a heart cycle)s and looping playback of the clipped one or more image frames.

24. The method of embodiment 19, further comprising generating a model curve from the separately recorded cycle graph and curve fitting a multiplicity of contemporaneous ones of the phases of the heart rhythm for the target heart muscle to the model curve so as to produce a simulated graph.

25. A data processing system adapted for circuitless heart rhythm determination during cardiac ultrasound, the system comprising:

a host computing platform comprising one or more computers, each comprising memory and at least one processor; and, a heart rhythm determination module comprising computer program instructions enabled while executing in the host computing platform to perform:

capturing through a cardiac ultrasound imaging device, a video clip of one or more image frames of a target heart muscle;

submitting the one or more image frames to a classifier trained with an annotated set of images each of a corresponding heart muscle captured at a specified phase of a heart rhythm with a ground truth indication of the specified phase of the heart rhythm drawn from a separately recorded cycle graph of an electrical signal measured over time for the corresponding heart muscle;

receiving in response to the submission, a classification of different portions of the submitted one or more image frames according to corresponding phases of the heart rhythm (e.g. a heart cycle); and, determining a contemporaneous one of the corresponding phases of the heart rhythm for the target heart muscle without sensing electrical signals by way of a closed-loop sensor circuit affixed proximately to the target heart muscle.

26. The system of embodiment 25, wherein the classification of the captured imagery is the classification of a portion of the one or more image frames corresponding to an R-wave portion of the cycle graph measured over the heart rhythm (e.g. a heart cycle).

27. The system of embodiment 25, wherein the classification of the captured imagery is the classification of a portion of the one or more image frames corresponding to an R-to-R interval of the cycle graph measured over multiple different heart rhythm (e.g. a heart cycle)s.

28. The system of embodiment 25, further comprising identifying portions of the one or more image frames corresponding to an R-wave and removing remaining other portions of the one or more image frames.

29. The system of embodiment 28, further comprising specifying a number of the different heart rhythm (e.g. a heart cycle)s, clipping the one or more image frames to include only portions of the one or more image frames corresponding to the R-to-R interval for the specified number of the different heart rhythm (e.g. a heart cycle)s and looping playback of the clipped one or more image frames.

30. The system of embodiment 25, wherein the program instructions further perform generating a model curve from the separately recorded cycle graph and curve fitting a multiplicity of contemporaneous ones of the corresponding phases of the heart rhythm for the target heart muscle to the model curve so as to produce a simulated graph.

31. A computer program product for circuitless heart rhythm determination during cardiac ultrasound, the computer program product including a computer readable storage medium having program instructions embodied therewith, the program instructions executable by a device to cause the device to perform a method including:

capturing through a cardiac ultrasound imaging device, a video clip of one or more image frames of a target heart muscle;

submitting the one or more image frames to a classifier trained with an annotated set of images each of a corresponding heart muscle captured at a specified phase of a heart rhythm with a ground truth indication of the specified phase of the heart rhythm drawn from a separately recorded cycle graph of an electrical signal measured over time for the corresponding heart muscle;

receiving in response to the submission, a classification of different portions of the submitted one or more image frames according to corresponding phases of the heart rhythm (e.g. a heart cycle); and, determining a contemporaneous one of the corresponding phases of the heart rhythm for the target heart muscle without sensing electrical signals by way of a closed-loop sensor circuit affixed proximately to the target heart muscle.

32. The computer program product of embodiment 31, wherein the classification of the captured imagery is the classification of a portion of the one or more image frames corresponding to an R-wave portion of the cycle graph measured over the heart rhythm (e.g. a heart cycle).

33. The computer program product of embodiment 31, wherein the classification of the captured imagery is the classification of a portion of the one or more image frames corresponding to an R-to-R interval of the cycle graph measured over multiple different heart rhythm (e.g. a heart cycle)s.

34. The computer program product of embodiment 31, wherein the method further comprises identifying portions of the one or more image frames corresponding to an R-wave and removing remaining other portions of the one or more image frames.

35. The computer program product of embodiment 33, wherein the method further comprises specifying a number of the different heart rhythm (e.g. a heart cycle)s, clipping the one or more image frames to include only portions of the one or more image frames corresponding to the R-to-R interval for the specified number of the different heart rhythm (e.g. a heart cycle)s and looping playback of the clipped one or more image frames.

36. The computer program product of embodiment 31, wherein the method further comprises generating a model curve from the separately recorded cycle graph and curve fitting a multiplicity of contemporaneous ones of the corresponding phases of the heart rhythm for the target heart muscle to the model curve so as to produce a simulated graph.

The invention claimed is:

1. A system for ultrasound imaging, the system comprising:
at least one processor; and
a memory comprising instructions that, when executed by the processor,
cause the system to perform a method, the method comprising:
obtaining a plurality of ultrasound images of at least a portion of an organ of a subject, the plurality of ultrasound images comprising images captured across at least a portion of one full heart rhythm;
providing a machine learning model comprising a neural network trained to correlate ultrasound images with a cardiac heart cycle phase;
determining based on one or more of the acquired plurality of ultrasound images, a contemporaneous heart rhythm characteristic corresponding to the one or more of the acquired plurality of images using the machine learning model, the contemporaneous heart rhythm characteristic comprising an image-derived EKG; and
providing a heart rhythm quality indicator to a user based on the determined contemporaneous heart rhythm characteristic comprising the image-derived EKG.

2. The system of claim 1, wherein the method comprises computing a deviation between the determined contemporaneous heart rhythm characteristic and a reference heart rhythm characteristic, and the heart rhythm quality indicator is based on the computed deviation.

3. The system of claim 2, wherein the reference heart rhythm characteristic is a normal sinus rhythm.

4. The system of claim 3, wherein the heart rhythm quality indicator is provided in real time during acquisition of the plurality of ultrasound images by the ultrasound imaging system.

5. The system of claim 3, wherein the heart rhythm quality indicator further comprises an indication that the subject is in sinus rhythm and/or that a multiframe image clip comprised in the plurality of ultrasound images can be used for an assessment that requires the normal sinus rhythm.

6. The system of claim 5, further comprising automatically saving the multiframe image clip in a memory of the ultrasound system upon determination that (i) images representing at least one full heart rhythm have been acquired; and (ii) the assessment that requires the normal sinus rhythm can be performed using the multiframe image clip.

7. The system of claim 3, wherein the method comprises providing a real-time display of the image-derived EKG to the user of the system.

8. The system of claim 7, wherein computing the deviation of the heart rhythm characteristic from a normal sinus rhythm comprises computing a deviation between the image-derived EKG and a 12-lead EKG of a normal sinus rhythm.

9. The system of claim 1, wherein the organ is a heart.

10. The system of claim 9, wherein the neural network is trained using a plurality of training images comprising a subset of images annotated with heart rhythm information.

* * * * *